US010259295B2

(12) United States Patent
Watanabe et al.

(10) Patent No.: US 10,259,295 B2
(45) Date of Patent: Apr. 16, 2019

(54) WINDING DEVICE

(71) Applicants: HAYASHI TELEMPU Co., Ltd., Nagoya-shi, Aichi (JP); NIFCO INC., Yokosuka-shi, Kanagawa (JP)

(72) Inventors: Keisuke Watanabe, Aichi (JP); Toshiya Nishiura, Aichi (JP); Yoshihiro Tsuchimoto, Aichi (JP); Naofumi Yagame, Kanagawa (JP)

(73) Assignees: HAYASHI TELEMPU Co., Ltd., Nagoya-shi, Aichi (JP); NIFCO INC., Yokosuka-shi, Kanagawa (JP)

( * ) Notice: Subject to any disclaimer, the term of this patent is extended or adjusted under 35 U.S.C. 154(b) by 336 days.

(21) Appl. No.: 15/296,033

(22) Filed: Oct. 18, 2016

(65) Prior Publication Data

US 2017/0036520 A1     Feb. 9, 2017

Related U.S. Application Data

(63) Continuation of application No. PCT/JP2015/063584, filed on May 12, 2015.

(30) Foreign Application Priority Data

May 23, 2014   (JP) ................................ 2014-107189

(51) Int. Cl.
*B60J 1/20* (2006.01)
*B60J 3/02* (2006.01)
(Continued)

(52) U.S. Cl.
CPC ............... *B60J 3/02* (2013.01); *B60J 1/2033* (2013.01); *B60J 1/2038* (2013.01); *B65H 75/425* (2013.01); *B65H 75/4418* (2013.01)

(58) Field of Classification Search
CPC ... B60J 3/02; B60J 1/2038; B60J 3/00; B65H 75/425; B65H 75/4418
See application file for complete search history.

(56) References Cited

U.S. PATENT DOCUMENTS 7,252,470 B1    8/2007   Sanchez
9,917,433 B1 *  3/2018   Jiang ..................... H02G 11/02
(Continued)

FOREIGN PATENT DOCUMENTS

JP      2003-211957 A      7/2003
JP      2005-329940 A     12/2005
(Continued)

OTHER PUBLICATIONS

Japanese notice of the reason for refusal dated Jul. 25, 2017.
(Continued)

*Primary Examiner* — William A. Rivera
(74) *Attorney, Agent, or Firm* — Yukoi & Co., U.S.A.; Toshiyuki Yokoi

(57) ABSTRACT

The present invention discloses a winding device that includes a screen, a shaft portion to which one end of the screen is fastened, a rotary shaft member that fits to an end portion of the shaft portion so that the rotary shaft member is rotated around a rotation axis along an axial direction of the shaft portion, and a biasing portion that biases the rotary shaft member in a rotation direction for winding the screen. A relative rotation restriction structure and a movement restriction structure are formed on a fitting portion between the shaft portion and the rotary shaft member. The relative rotation restriction structure restricts a relative rotation of the shaft portion with respect to the rotary shaft member. The movement restriction structure restricts a movement of the shaft portion in the axial direction with respect to the rotary shaft member.

5 Claims, 16 Drawing Sheets

(51) Int. Cl.
*B65H 75/42* (2006.01)
*B65H 75/44* (2006.01)

(56) References Cited

U.S. PATENT DOCUMENTS

| | | |
|---|---|---|
| 2003/0131953 A1 | 7/2003 | Coulibaly et al. |
| 2005/0257903 A1 | 11/2005 | Schimko et al. |
| 2007/0272375 A1 | 11/2007 | Hansen |
| 2011/0209837 A1 | 9/2011 | Wieczorek et al. |
| 2012/0180960 A1* | 7/2012 | Oya .................. B60J 1/2038 160/370.21 |
| 2012/0305204 A1 | 12/2012 | Oya |

FOREIGN PATENT DOCUMENTS

| | | |
|---|---|---|
| JP | 2007-314169 A | 12/2007 |
| JP | 2011-148352 A | 8/2011 |
| JP | 2013-230752 A | 11/2013 |
| JP | 2014-145171 A | 8/2014 |

OTHER PUBLICATIONS

International Search Report for PCT/JP2015/063584 dated Aug. 4, 2015.
PCT written opinion dated Aug. 4, 2015.

\* cited by examiner

WINDING DEVICE

CROSS-REFERENCES TO RELATED APPLICATIONS

This Application claims the benefit of priority and is a Continuation application of the prior International Patent Application No. PCT/JP2015/063584, with an international filing date of May 12, 2015, which designated the United States, and is related to the Japanese Patent Application No. 2014-107189, filed May 23, 2014, the entire disclosures of all applications are expressly incorporated by reference in their entirety herein.

BACKGROUND OF THE INVENTION

1. Field of the Invention

The present invention relates to a winding device installed in a vehicle cabin of an automobile or the like.

2. Description of Related Art

On a vehicle door or the like, a sunshade device is provided for blocking sunlight for the purpose of preventing dazzling and for protecting privacy in the vehicle. In addition, a tonneau cover device is provided on a luggage compartment of the automobile to cover an upper part of the luggage compartment. In the winding device such as the sunshade device and the tonneau cover device, a screen is wound when not in use.

In Japanese Unexamined Patent Application Publication No. 2005-329940, a window shade device for automobile has a shade sheet, a winding shaft to which one end of the shade sheet is fixed, a coil spring that biases the winding shaft, a coil spring housing that forms a cover of a window shade housing in a lateral direction, and a connecting shaft that is connected to the coil spring at one end. A long end portion located at the other end of the connecting shaft is formed in a rectangular shape in a cross section. An opening portion having a rectangular shape in a cross section is formed on an end face of the winding shaft so as to be matched with an outline shape of the end portion of the connecting shaft. Accordingly, the end portion of the connecting shaft and the opening portion of the winding shaft have a shape allowing the winding shaft to move in an axial direction with respect to the connecting shaft. On the connecting shaft, an annular groove is formed to prevent the connecting shaft from being pulled out of the coil spring housing. When a U-shaped part of a spring clip is entered in the annular groove of the connecting shaft and both ends of the spring clip are inserted into holes of the coil spring housing, the connecting shaft is prevented from being pulled out of the coil spring housing. When the end portion of the connecting shaft is inserted into the opening portion of the winding shaft, a rotational force of the coil spring is transferred to the winding shaft via the connecting shaft.

BRIEF SUMMARY OF THE INVENTION

In the above described window shade device, the winding shaft is allowed to be moved in the axial direction with respect to the connecting shaft. Hence, there is a possibility that the shade sheet is displaced in the axial direction when in use to make the shading area be insufficient. In addition, there is a possibility that the winding shaft or the like is moved in the axial direction due to traveling vibration of the vehicle causing abnormal noise.

Note that the above described problems also occur in a tonneau cover device and other winding devices other than the window shade device.

The present invention discloses a winding device that enables to improve usability.

One aspect of the present invention provides a winding device, comprising: a screen; a shaft portion to which one end of the screen is fastened; a rotary shaft member that fits to an end portion of the shaft portion so that the rotary shaft member is rotated around a rotation axis along an axial direction of the shaft portion; and a biasing portion that biases the rotary shaft member in a rotation direction for winding the screen, wherein a relative rotation restriction structure and a movement restriction structure are formed on a fitting portion between the shaft portion and the rotary shaft member, the relative rotation restriction structure restricting a relative rotation of the shaft portion with respect to the rotary shaft member, the movement restriction structure restricting a movement of the shaft portion in the axial direction with respect to the rotary shaft member.

DETAILED DESCRIPTION OF THE INVENTION

Figure 1:
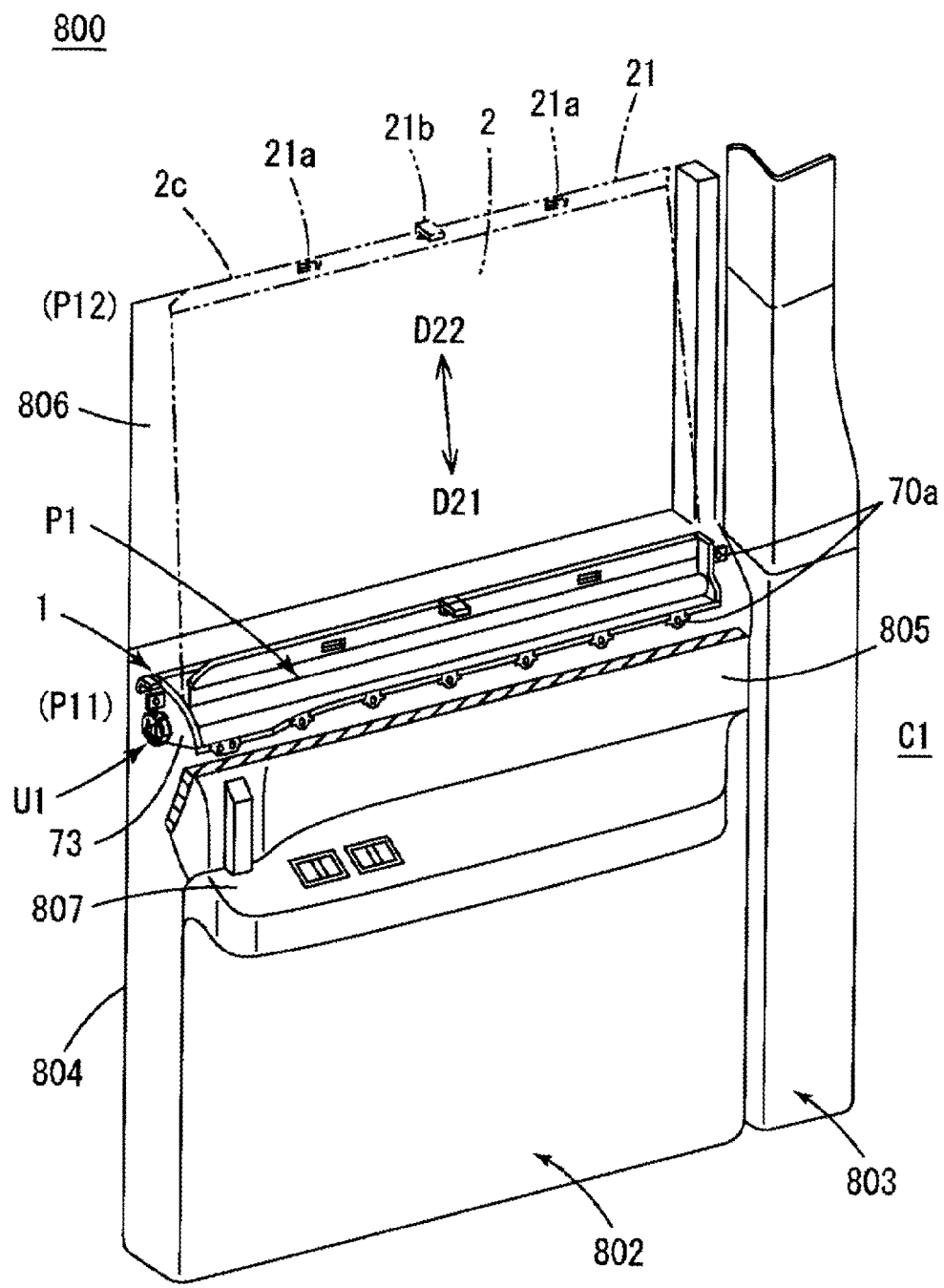
FIG. 1 is a perspective view showing an example of a side door to which a winding device 1 is assembled, seen from a vehicle cabin C1 side.

Hereafter, embodiments of the present invention will be explained. Of course, the below-described embodiments merely exemplify the present invention. All features disclosed in the embodiments are not necessarily essential for solving the present invention.

(1) Outline of Present Technology

First, with reference to FIGS. 1 to 16, an outline of the present technology will be explained. Note that FIGS. 1 to 16 are schematically shown figures and therefore each of the figures may not fit together.

A winding device 1 includes, as basic components, a screen 2, a shaft portion 3 to which one end 2b of the screen 2 is fastened, a rotary shaft member (shaft 4) that fits to an end portion 3a of the shaft portion 3 so that the rotary shaft member (4) is rotated around a rotation axis AX1 along an axial direction D1 of the shaft portion 3, and a biasing portion 5 that biases the rotary shaft member (4) in a rotation direction DR1 for winding the screen 2. A relative rotation restriction structure 11 and a movement restriction structure 12 are formed on a fitting portion 10 between the shaft portion 3 and the rotary shaft member (4). The relative rotation restriction structure 11 restricts a relative rotation of the shaft portion 3 with respect to the rotary shaft member (4). The movement restriction structure 12 restricts a movement of the shaft portion 3 in the axial direction D1 with respect to the rotary shaft member (4).

The shaft portion 3 is prevented from being moved in the axial direction D1 with respect to the rotary shaft member (4) which is biased in the rotation direction DR1 for winding the screen 2. Consequently, the displacement of the screen 2 in the axial direction D1 is suppressed and abnormal noise caused by the vibration is suppressed. In addition, if a buffer material (separate member) for suppressing abnormal noise is provided on an end face of the shaft portion 3, the number of parts increases and manufacturing cost increases. However, such a buffer material is not required by using the present technology. Accordingly, the present technology can provide the winding device that enables to improve usability.

Here, the screen can be any screen as long as it blocks at least a part of transmitted light. The screen is not limited to the purpose of sun shading.

The shaft portion includes a cylindrical member, a rod-like member and the like. The shaft portion can be a single member or a combination of a plurality of members. For example, the shaft portion can be a combination of a shaft body 31 and a rotor member 33.

The biasing portion includes a biasing mechanism such as a spring and a rubber and also includes an electrically driven device, for example.

To restrict the relative rotation of the shaft portion with respect to the rotary shaft member means that the relation of the rotation angle between the rotary shaft member and the shaft portion is maintained. Thus, when the rotary shaft member is not rotated, the shaft portion is not rotated. When the rotary shaft member is rotated, the shaft portion is rotated according to the rotation of the rotary shaft member.

To restrict the movement of the shaft portion in the axial direction with respect to the rotary shaft member means that the positional relation between the rotary shaft member and the shaft portion is maintained in the axial direction. Thus, when the rotary shaft member is not moved in the axial direction, the shaft portion is not moved in the axial direction.

The relative rotation restriction structure 11 can allow the movement of the shaft portion 3 in the axial direction D1 with respect to the rotary shaft member (4). The movement restriction structure 12 and the relative rotation restriction structure 11 can be formed in different positions, and the movement restriction structure 12 can allow the relative rotation of the shaft portion 3 with respect to the rotary shaft member (4). In this embodiment, a load of the rotation and a load in the axial direction D both applied to the fitting portion 10 are separated into different positions. Thus, deformation and abrasion of the fitting portion can be suppressed.

The relative rotation restriction structure 11 can have a protruded portion 36 formed on the shaft portion 3 so as to be protruded toward the rotary shaft member (4) at a position that the rotation axis AX1 passes through. In addition, the relative rotation restriction structure 11 can have a recessed portion 42 formed on the rotary shaft member (4) so as to fit to the protruded portion 36 at the position that the rotation axis AX1 passes through. The protruded portion 36 protruded toward the rotary shaft member (4) is formed on the end portion 3a of the shaft portion 3. Thus, the protruded portion 36 can be temporarily placed on a hole (insertion hole 74) of an end portion of a case 7 when assembling the winding device 1. Accordingly, this embodiment can improve the operability of assembling the winding device.

Furthermore, the movement restriction structure 12 can have an outer cylinder portion 37 formed on the shaft portion 3 around the protruded portion 36 with the rotation axis AX1 as a center. In addition, the movement restriction structure 12 can have an inner cylinder portion 43 formed on the rotary shaft member (4) around the recessed portion 42 with the rotation axis AX1 as a center so as to be inserted between the protruded portion 36 and the outer cylinder portion 37. The outer cylinder portion 37 can have a hooking structure (e.g. pawl portion 37a) to restrict a movement of the outer cylinder portion 37 in the axial direction D1 with respect to the inner cylinder portion 43 which is inserted in the outer cylinder portion 37. The hooking structure (37a) can allow a relative rotation of the outer cylinder portion 37 with respect to the inner cylinder portion 43. In this embodiment, the fitting portion 10 between the shaft portion 3 and the rotary shaft member (4) is formed by three components comprised of the protruded portion 36 of the shaft portion 3, the inner cylinder portion 43 of the rotary shaft member (4) and the outer cylinder portion 37 of the shaft portion 3 in order from the rotation axis AX1 to an outside in the radial direction. Thus, the strength of the fitting portion against the load in the direction orthogonal to the axial direction can be increased.

The protruded portion 36 of the shaft portion 3 can have a portion (trifurcated portion 36b) formed in a trifurcated form in a cross section perpendicular to the rotation axis AX1. The recessed portion 42 of the rotary shaft member (4) can have a portion (trifurcated portion 42b) formed in a trifurcated form in a cross section perpendicular to the rotation axis AX1 so that the recessed portion 42 fits to the protruded portion 36. In this embodiment, the shaft portion and the rotary shaft member can fit to each other more easily compared with the case where the protruded portion and the recessed portion are formed in a rectangular shape in cross section at the fitting portion. In addition, deterioration due to repeated use can be suppressed compared with the case where the protruded portion and the recessed portion are formed in a cross shape in cross section at the fitting portion.

The protruded portion 36 of the shaft portion 3 can have a shape (taper shape 36*d*) tapered toward the tip of the protruded portion 36, the shape being closer to the rotation axis AX1 toward the tip (outside D11 in the axial direction). The recessed portion 42 of the rotary shaft member (4) can have a hole shape tapered toward the deep side of the recessed portion 42, the hole shape being closer to the rotation axis AX1 toward the deep side (outside D11 in the axial direction) so that the recessed portion 42 fits to the protruded portion 36. When the protruded portion 36 of the shaft portion 3 is inserted into the recessed portion 42 of the rotary shaft member (4), the tapered shape of the protruded portion 36 is guided by the tapered hole shape of the recessed portion 42. Thus, a relative rotation position of the rotary shaft member (4) with respect to the shaft portion 3 is determined. Accordingly, the shaft portion and the rotary shaft member can be easily fit to each other in this embodiment.

The hooking structure (37*a*) can have a pawl portion 37*a* protruded from an inner peripheral surface 37*i* of the outer cylinder portion 37 toward an inside (inside D4 in the radial direction). The movement restriction structure 12 can have an annular groove 44 recessed from an outer peripheral surface 43*o* of the inner cylinder portion 43 toward an inside (inside D4 in the radial direction). Thus, the movement of the shaft portion 3 in the axial direction D1 with respect to the rotary shaft member (4) can be restricted by inserting the pawl portion 37*a* into the annular groove 44. In this embodiment, the movement restriction structure can be formed by a simple structure by a combination of the annular groove of the rotary shaft member and the pawl portion of the shaft portion.

The shaft portion 3 can have a shaft body 31 and a rotor member 33. The shaft portion 3 has an opening 31*c* at an end portion 31*a*. The rotor member 33 is inserted into the opening 31*c* and fixed to the end portion 31*a* of the shaft body 31. The one end 2*b* of the screen 2 can be bonded to both an outer peripheral surface 31*o* of the shaft body 31 and an outer peripheral surface 37*o* of the rotor member 33 continuously. In this embodiment, the shaft body and the rotor member can be firmly fixed with each other.

The winding device 1 can further have a housing 6 that houses the biasing portion 5 so that the rotary shaft member (4) passes through the housing 6 and rotatable around the rotation axis AX1. In addition, the winding device 1 can further have a case 7 that has a wall portion 73 crossing the rotation axis AX1 so that the shaft portion 3 is held by the case 7 and rotatable around the rotation axis AX1. The housing 6 can have a housing body 60 and a shaft insertion portion 61 that is protruded from the housing body 60 toward the shaft portion 3 (inside D12 in the axial direction) at a position that the rotary shaft member (4) passes through. The housing 6 can further have a hooking portion 62 protruded outward (outside D3 in the radial direction) at an outside (outside D3 in the radial direction) with the rotation axis AX1 as a center. The wall portion 73 can have an insertion hole 74 that the shaft insertion portion 61 passes through. Here, the insertion hole leads to a recess a recess 75 that the hooking portion 62 passes through. The housing body 60 can be fixed to an outside of the wall portion 73 by inserting the shaft insertion portion 61 into the insertion hole 74 from an outside of the case 7 while the hooking portion 62 is aligned with the recess 75 and rotating the housing 6. In this embodiment, the winding device can be easily assembled and maintained.

(2) Concrete Example of Winding Device

FIG. 1 shows an example to use the winding device 1 as a sunshade device of a side door (802) of an automobile 800. In the figure, the winding device 1 is shown by breaking away an upper portion of the door trim 805. The automobile 800 shown in FIG. 1 is a road vehicle designed and equipped for being used on a road. In addition, the automobile 800 is a passenger car having a vehicle cabin C1 formed around front sheets and rear sheets. A door 802 and a pillar 803 are arranged at a side face portion of the vehicle cabin C1. The winding device 1 is assembled with the door 802 as a sunshade device (shading device). The shading device includes the devices called a shade device and a blind device. The winding device 1 shown in FIG. 1 is installed in an upper edge of the door trim 805 as an interior material of the side door. The screen 2 can be drawn out of the winding device 1.

A door panel 804, a door trim 805 and a door window 806 are provided on the door 802, for example. The door panel 804 is a kind of a vehicle body panel made of metal such as a steel sheet. The door trim 805 is an interior material attached to the vehicle cabin side of the panel 804. For the door trim 805, a molded article formed by molding a resin molding material such as a thermoplastic resin by using injection molding or the like, and a resin material in which a skin material, such as a non-woven fabric, a woven fabric and a knitted fabric, is laminated as an interior base material can be used, for example. On the door trim 805 shown in FIG. 1, an armrest 807 having a shape that enables a passenger to rest his/her arms for maintaining a comfortable posture is provided. The winding device 1 is assembled on a back side of the door trim 805 at a position upper than the armrest 807.

Figure 2:
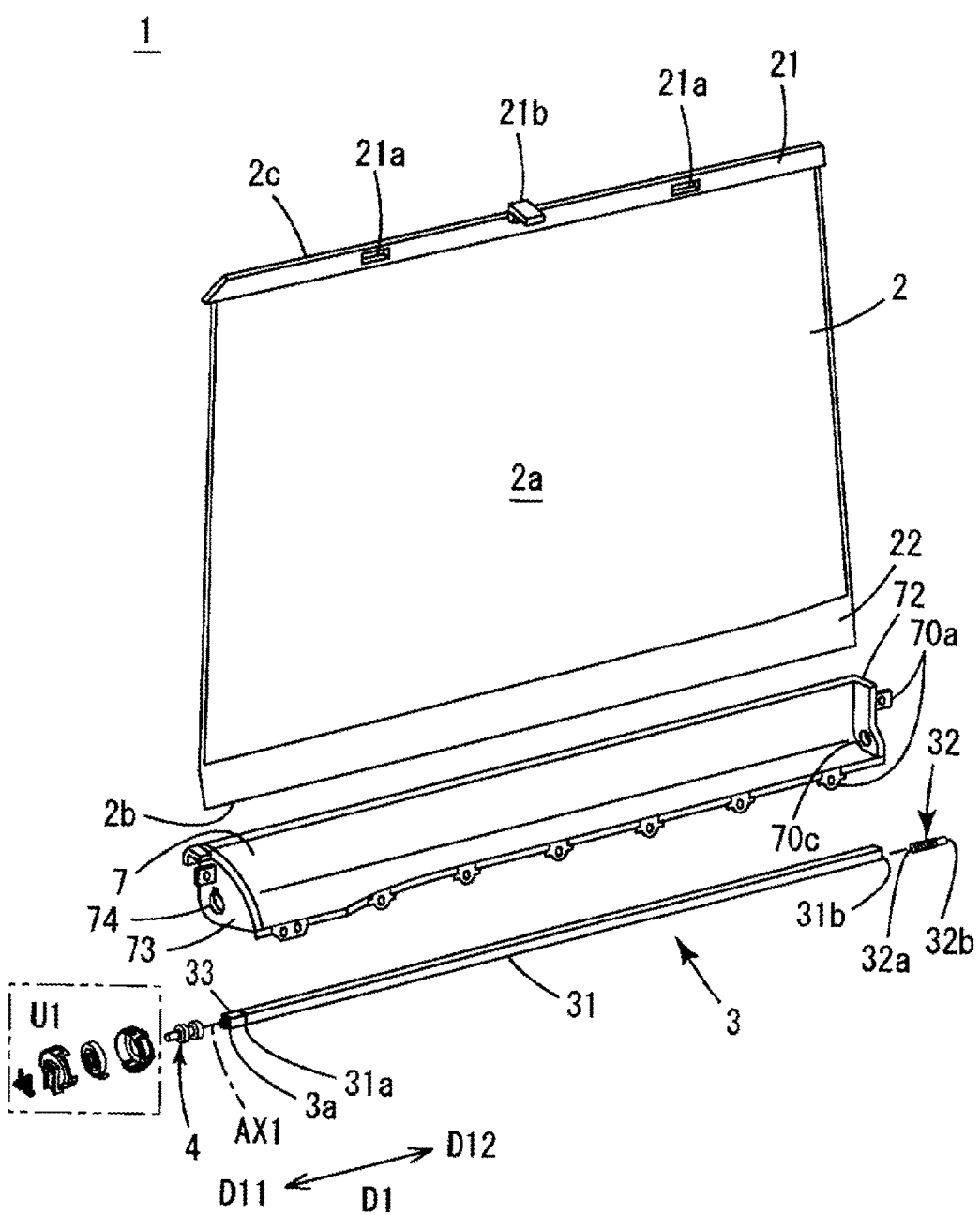
FIG. 2 is an exploded perspective view showing an example of a configuration of the winding device 1.
Figure 3:
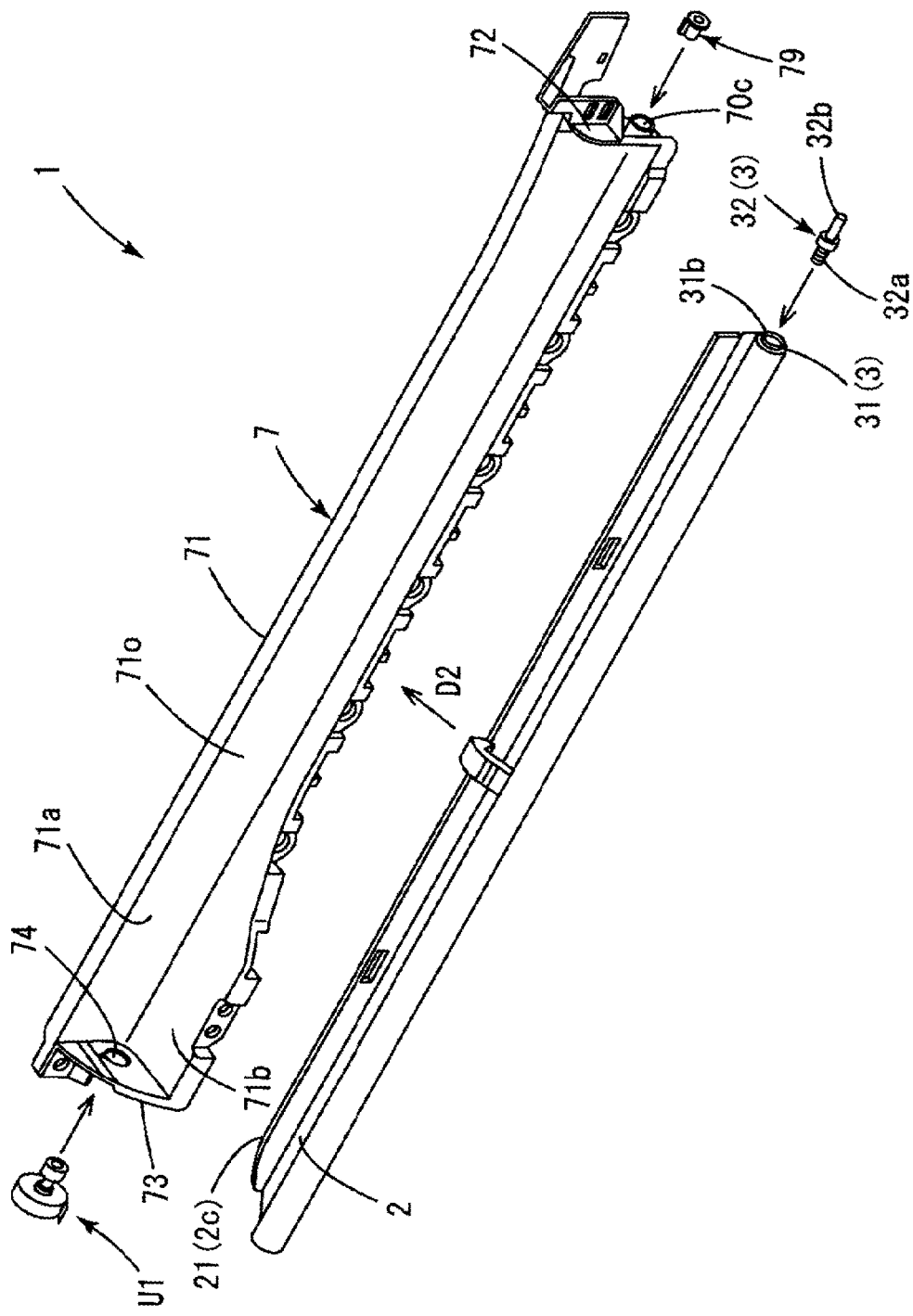
FIG. 3 is an exploded perspective view showing an example of a configuration of the winding device 1, seen from another angle.
Figure 4:
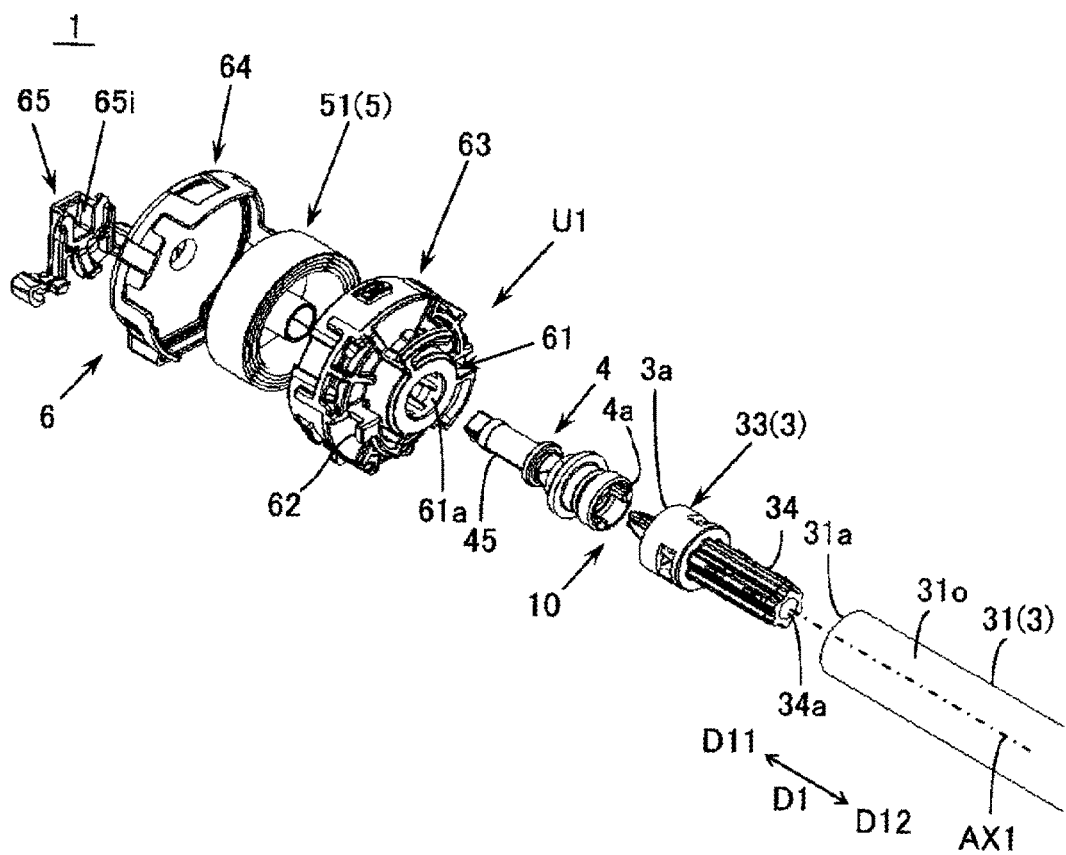
FIG. 4 is an exploded perspective view showing an example of a main part of the winding device 1.
Figure 5:
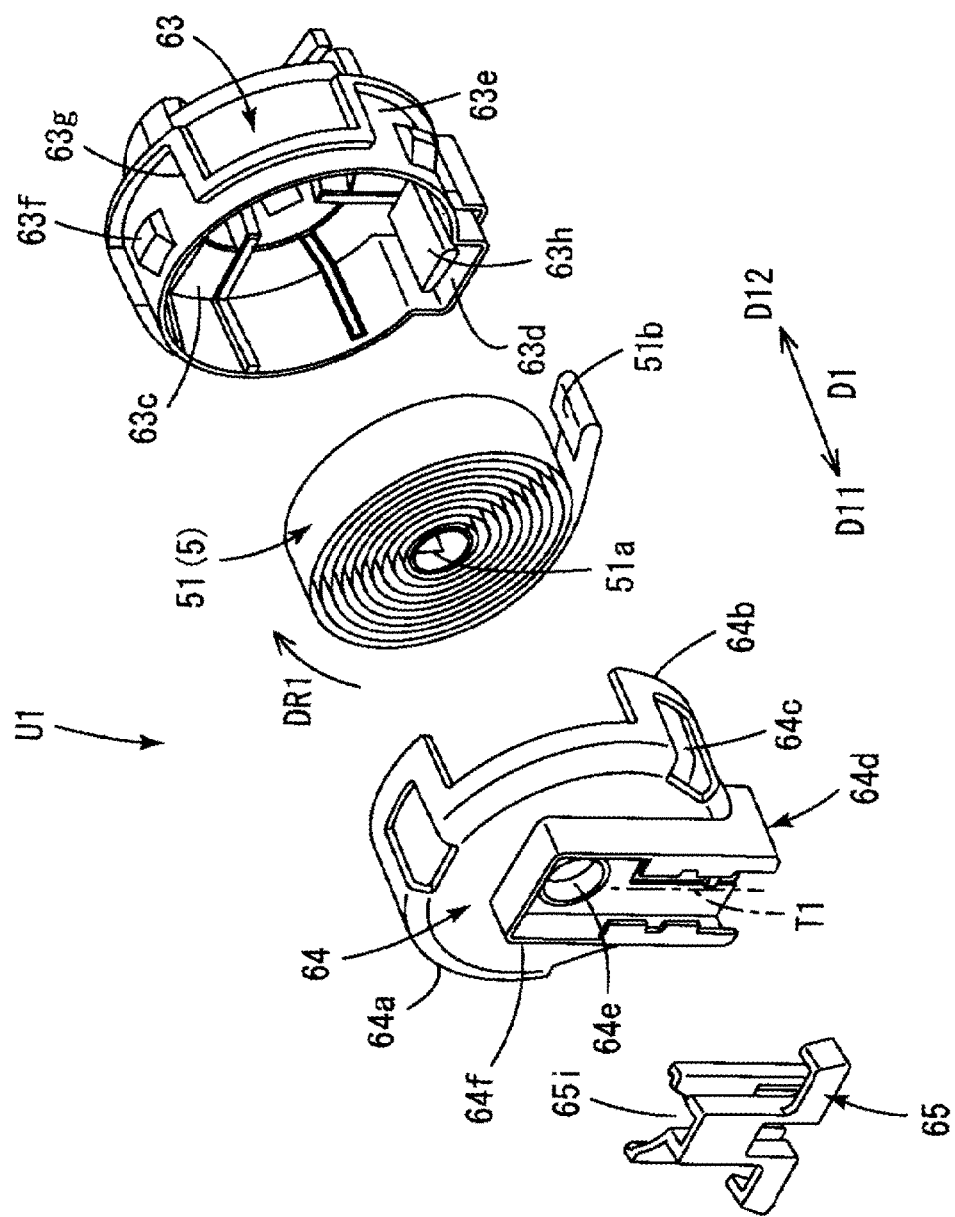
FIG. 5 is an exploded perspective view showing an example of a spring unit U1 excluding a shaft 4.
Figure 6:
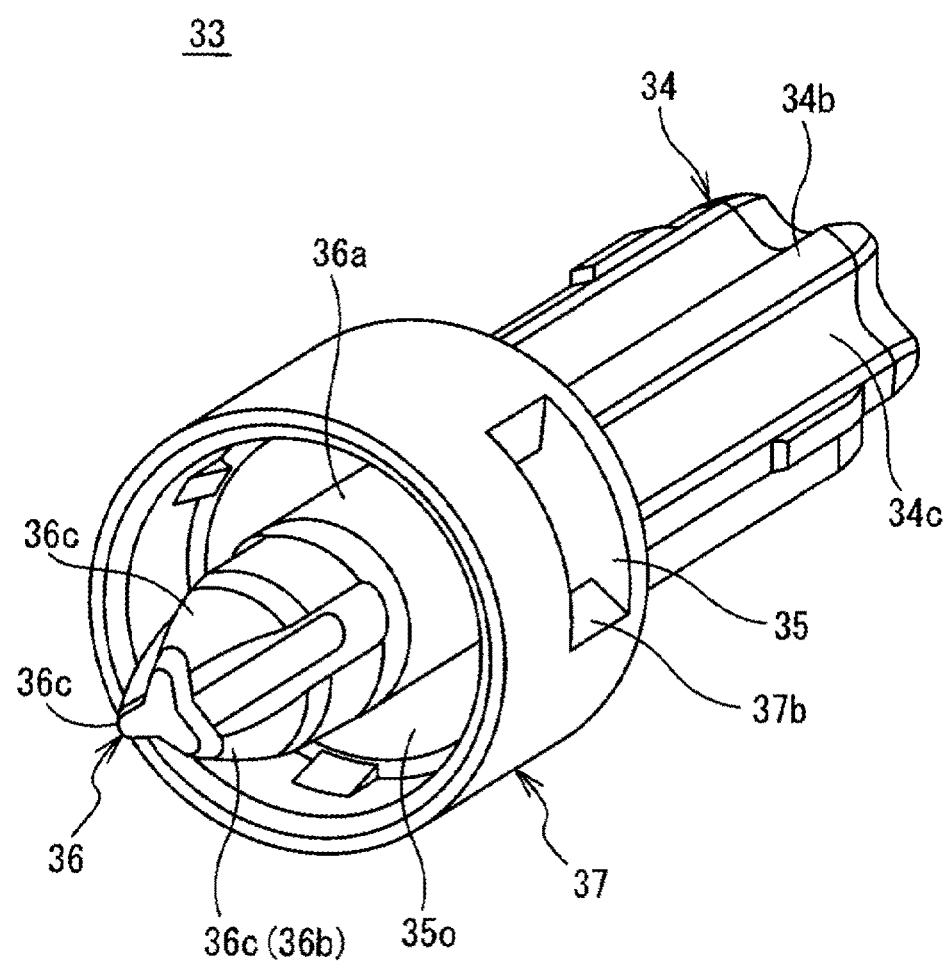
FIG. 6 is a perspective view showing an example of an outer appearance of a rotor member.
Figure 7:
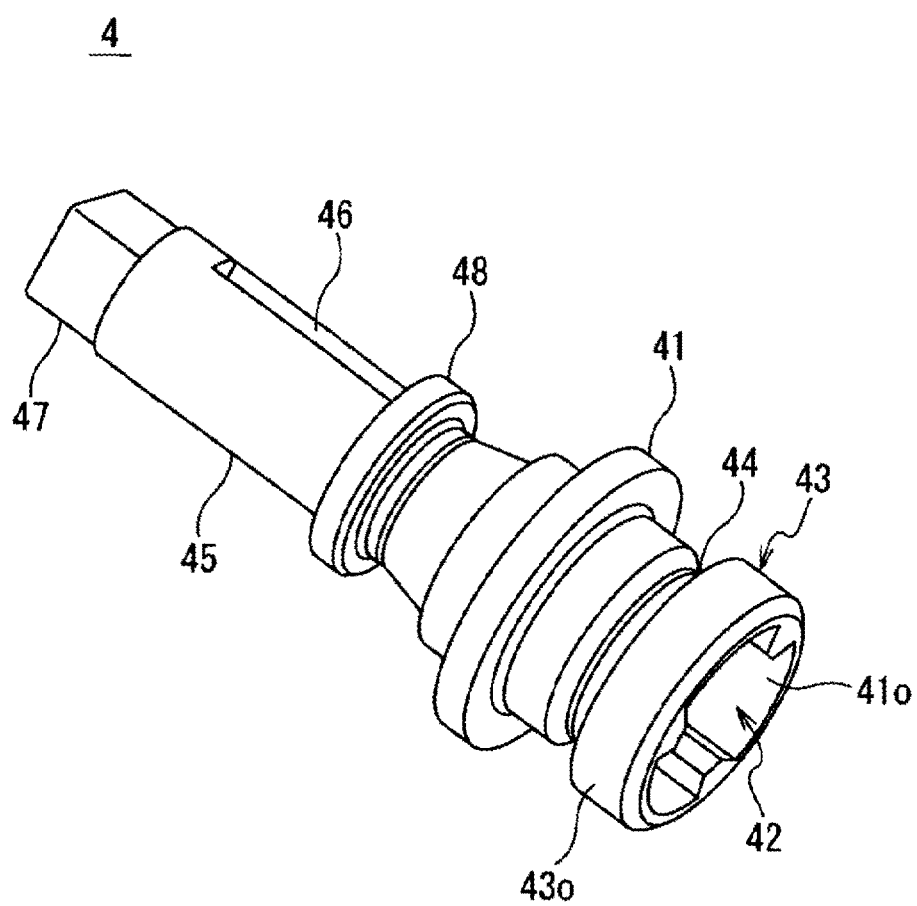
FIG. 7 is a perspective view showing an example of an outer appearance of a rotary shaft member.
Figure 8:
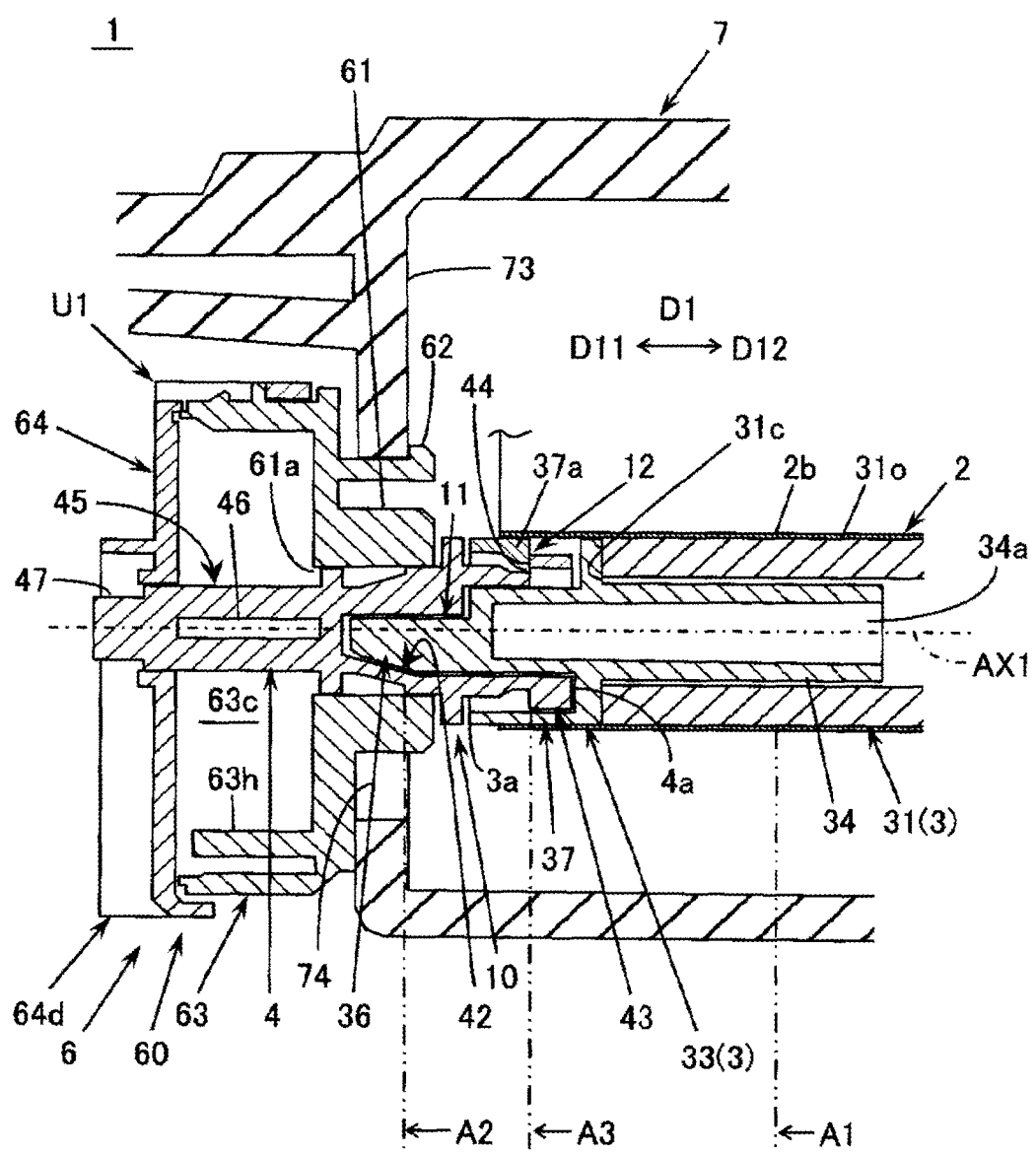
FIG. 8 is a vertical cross-sectional view showing an example of a main part of the winding device 1 in a vertical cross-section passing through a rotation axis AX1.
Figure 9A:
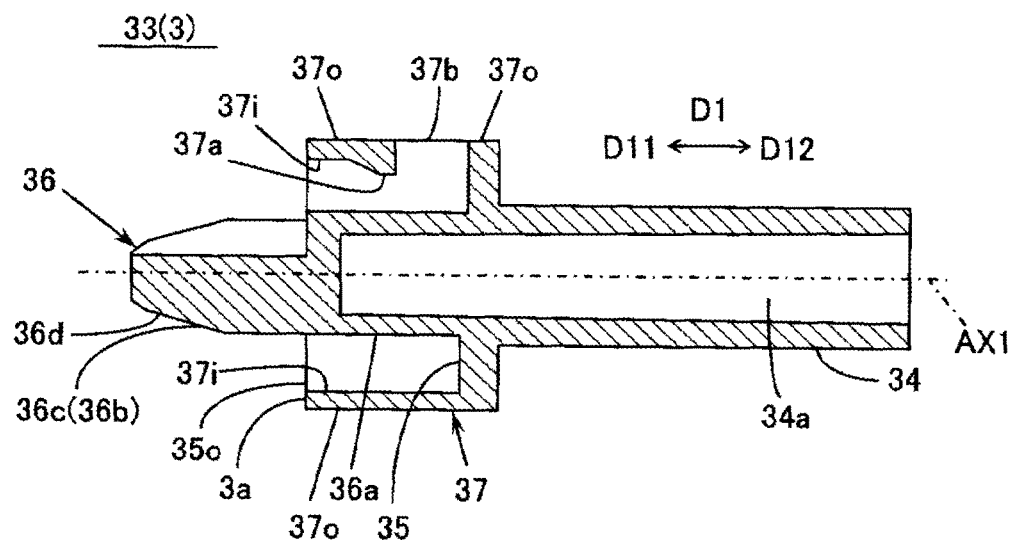
FIG. 9A is a vertical cross-sectional view showing an example of a rotor member 33 in the vertical cross-section passing through the rotation axis AX1.
Figure 9B:
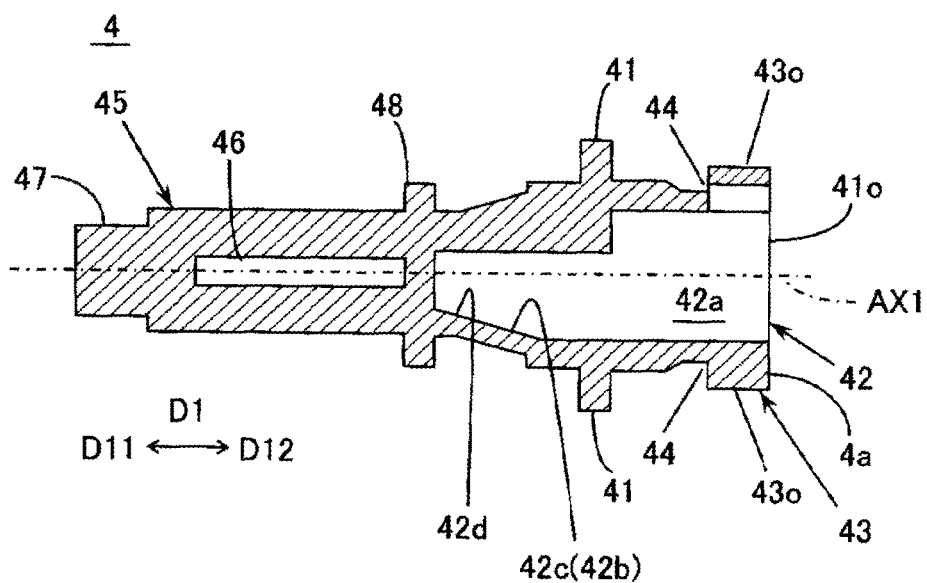
FIG. 9B is a vertical cross-sectional view showing an example of the shaft 4 in the vertical cross-section passing through the rotation axis AX1.
Figure 10A:
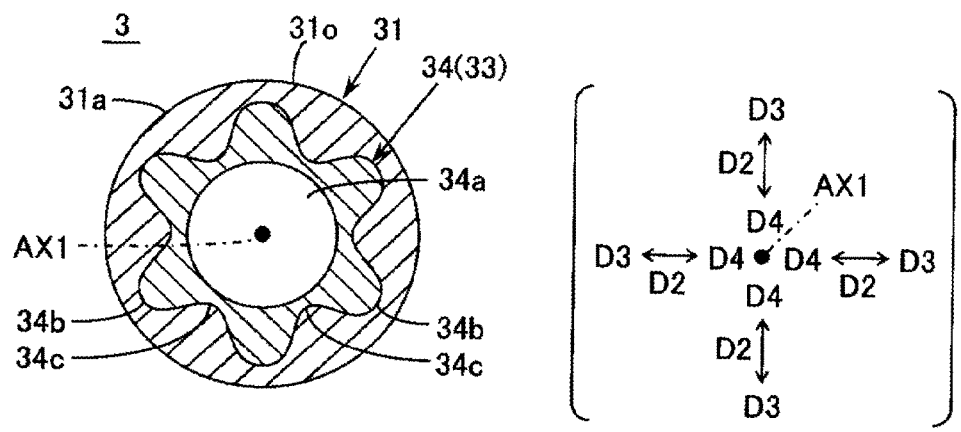
FIG. 10A is a transverse cross-sectional view showing an example of a transverse cross-section of a shaft portion 3 at a portion where the rotor member 33 is fitted to a shaft body 31.
Figure 10B:
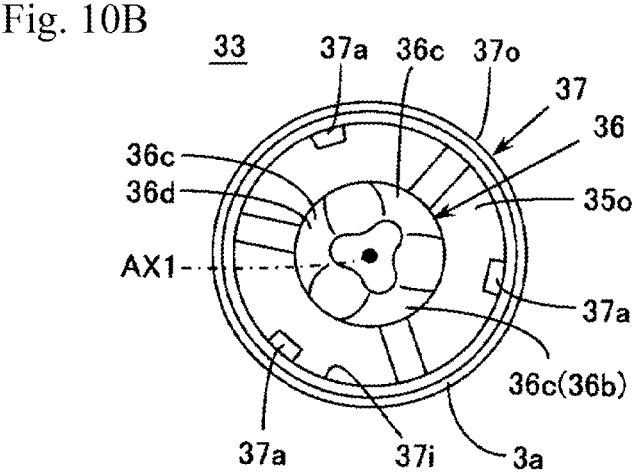
FIG. 10B is a drawing showing an example of an end portion of the rotor member 33 at a protruded portion 36 side.
Figure 10C:
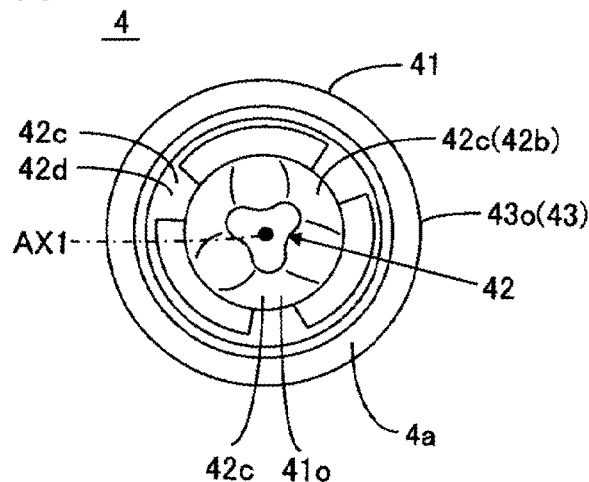
FIG. 10C is a drawing showing an example of an end portion of the shaft 4 at a recessed portion 42 side.
Figure 11A:
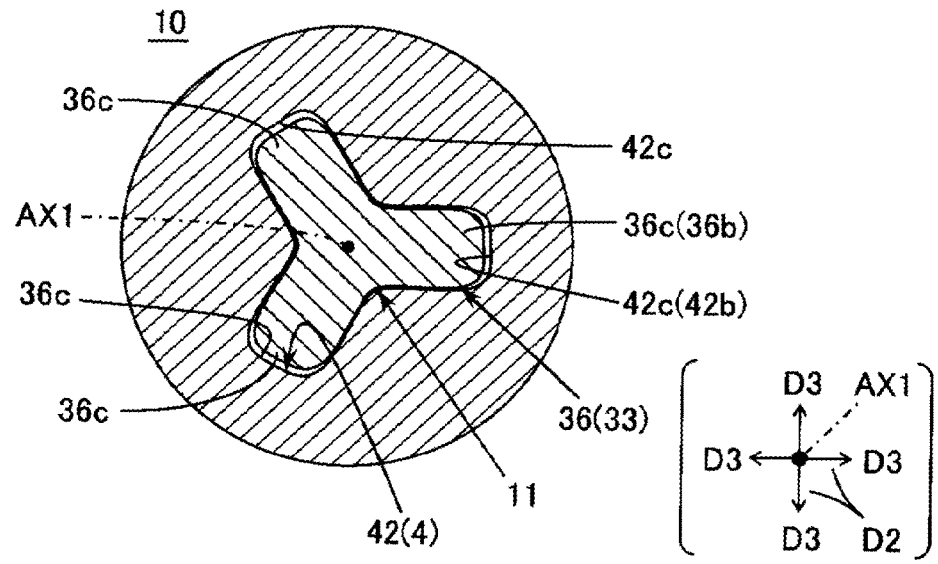
FIG. 11A is a transverse cross-sectional view showing an example of a transverse cross-section of a fitting portion 10 at a portion where the protruded portion 36 is inserted into the recessed portion 42.
Figure 11B:
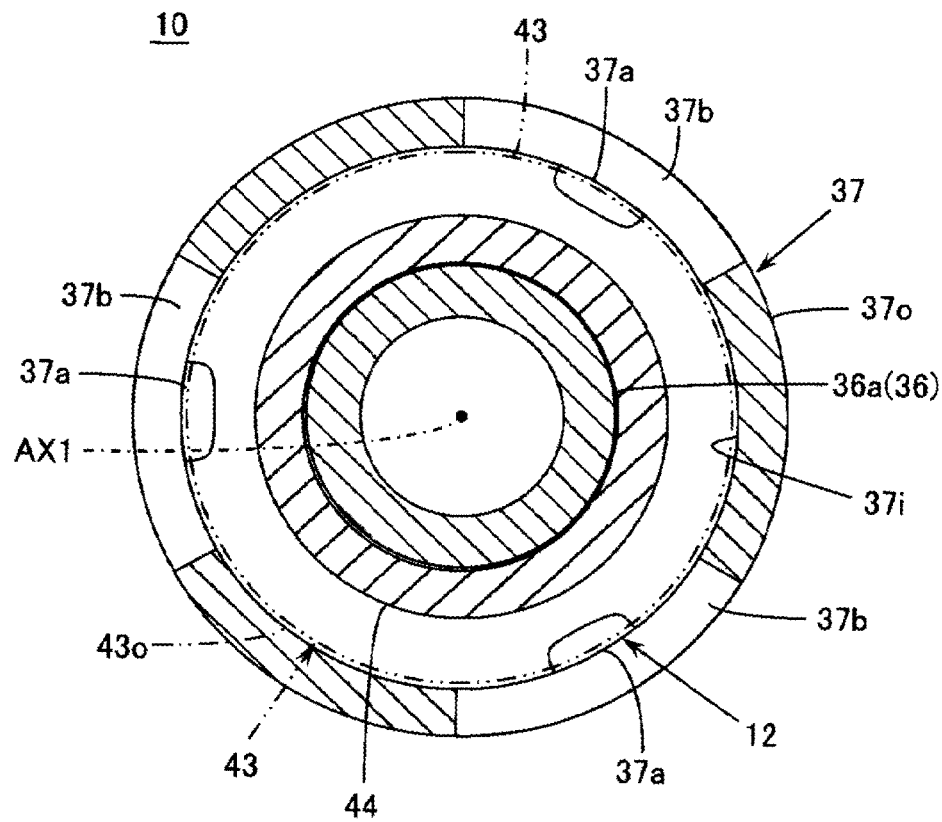
FIG. 11B is a transverse cross-section showing an example of a transverse cross-section of the fitting portion 10 at a portion where the inner cylinder portion 43 is inserted between the protruded portion 36 and an outer cylinder portion 37.
Figure 12:
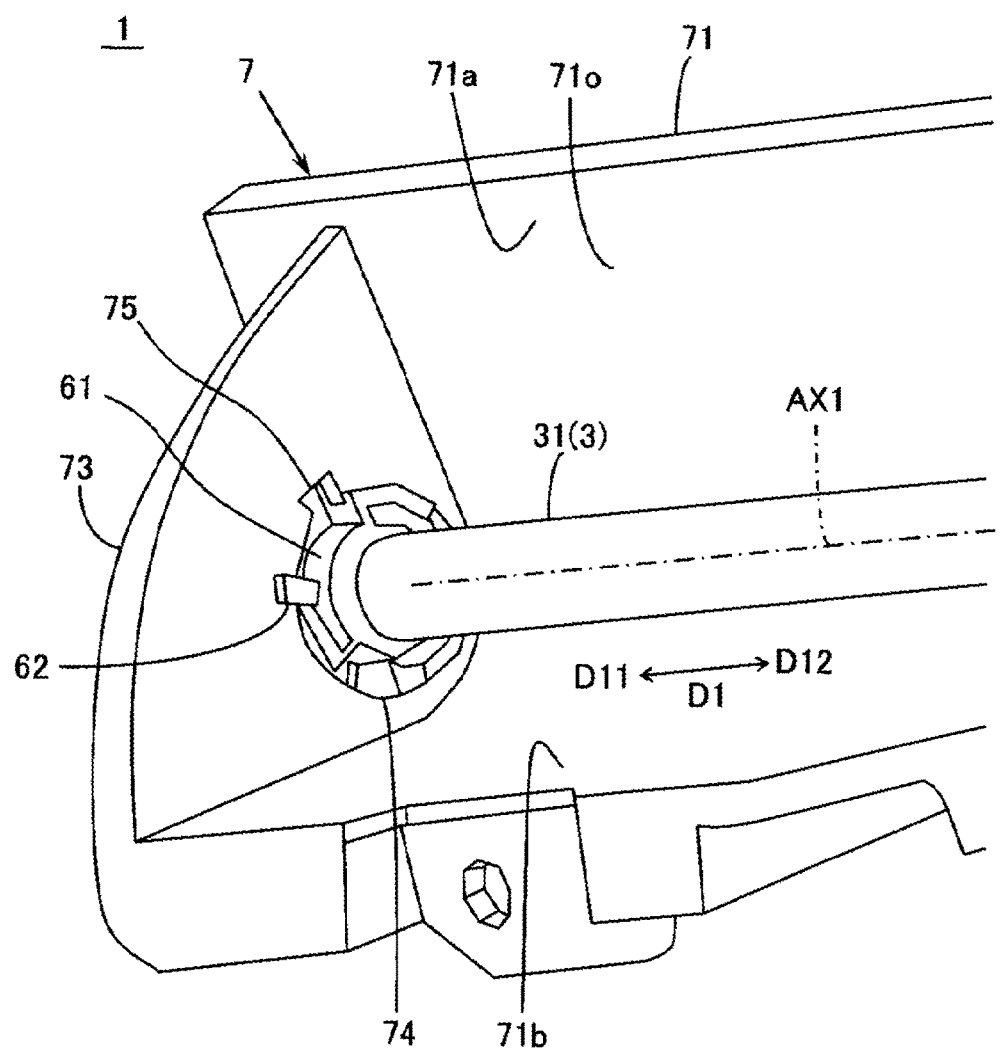
FIG. 12 is a perspective view showing an example of a main part of the winding device 1.
Figure 13:
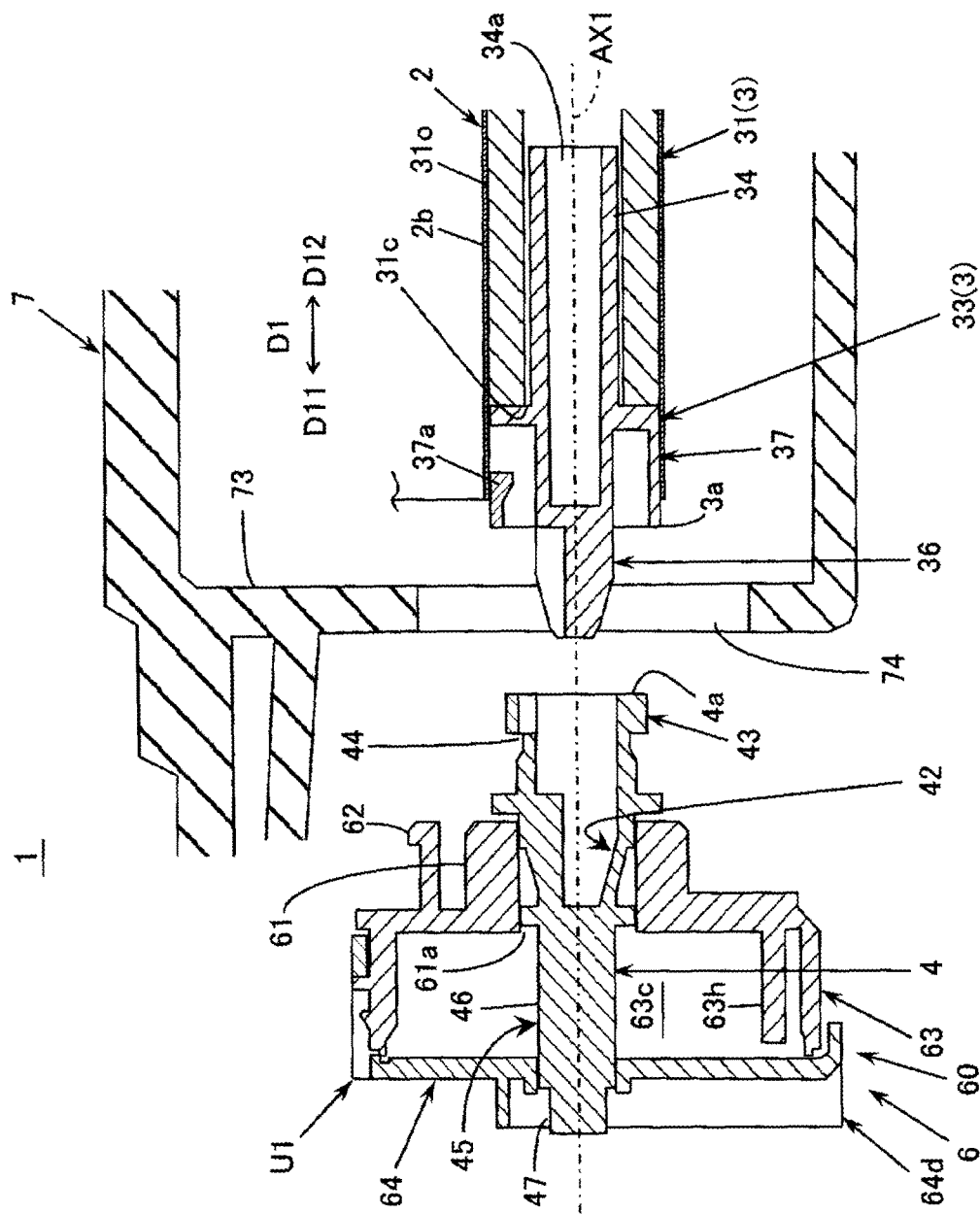
FIG. 13 is a vertical cross-sectional view showing an example of a state to fit the rotary shaft member and the shaft portion with each other.
Figure 14:
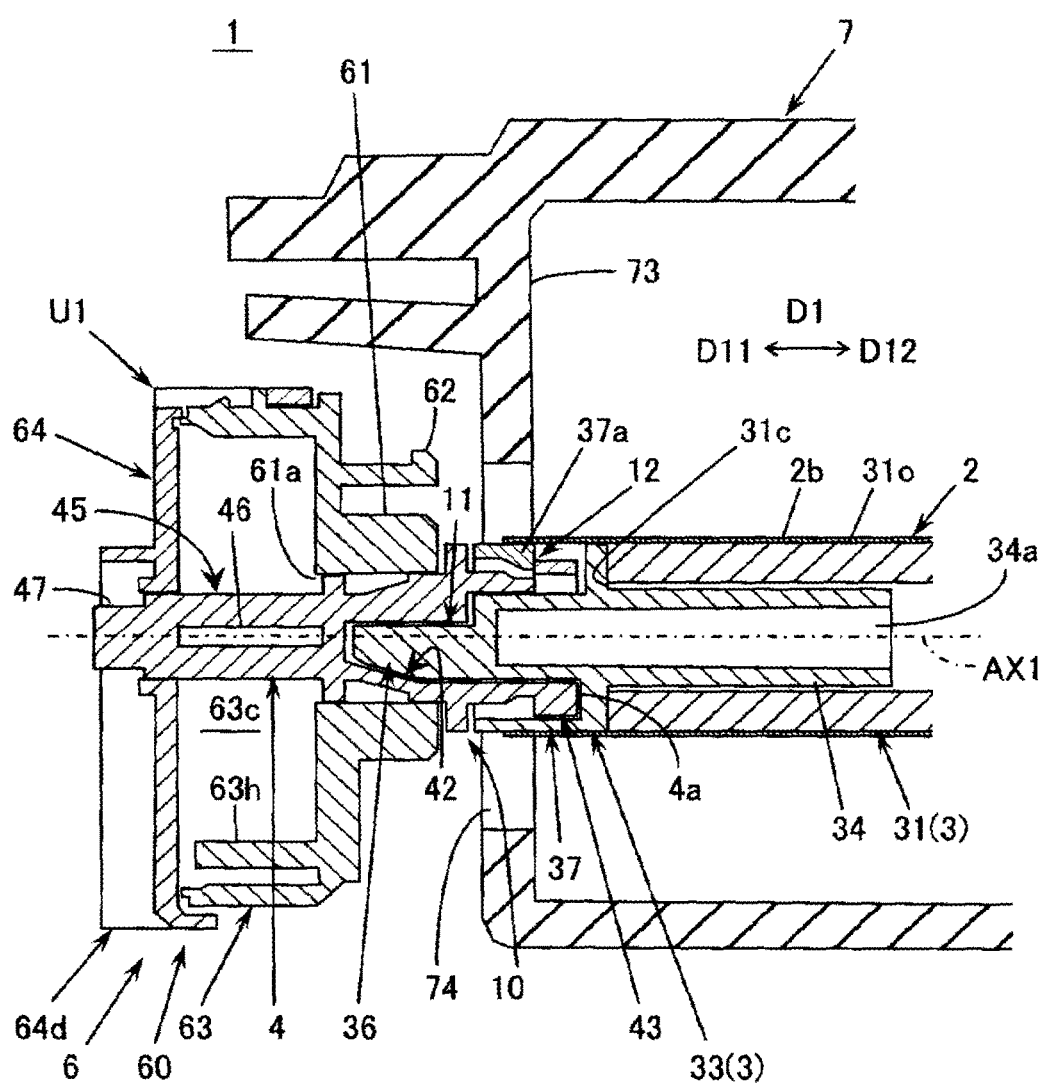
FIG. 14 is a vertical cross-sectional view showing an example of a state that the rotary shaft member and the shaft portion are fitted with each other.

In FIG. 1, the winding device 1 in which the screen 2 is wound around (housed in) the shaft portion 3 is shown by a solid line, and a state that the screen 2 is drawn out upward is shown by a two-dot chain line. FIG. 2 shows the winding device 1 in a state that the components are partly disassembled. FIG. 3 shows the winding device 1 from another angle in a state that the components are partly disassembled. FIG. 4 shows a main part of the winding device 1 in a state that the components are partly disassembled. FIG. 5 shows the components of a spring unit U1 excluding a shaft 4 in a disassembled state. FIG. 6 shows an outer appearance of the rotor member 33. FIG. 7 shows an outer appearance of the shaft (rotary shaft member) 4. FIG. 8 is a vertical cross-sectional view showing a main part of the winding device 1 in a vertical cross-section passing through the rotation axis AX1. The vertical cross-section means a cross section along a longitudinal direction of a long object. FIG. 9A shows the rotor member 33 extracted from FIG. 8. FIG. 9B shows the shaft 4 extracted from FIG. 8. FIG. 10A shows a transverse cross-section of the shaft portion 3 at the position A1 in FIG. 8. FIG. 10B shows an end portion 3*a* of the rotor member 33 at the protruded portion 36 side. FIG. 10C shows an end portion 4*a* of the shaft 4 at the recessed portion 42 side. The transverse cross-section means a cross section orthogonal to a longitudinal direction of a long object. FIG. 11A shows a transverse cross-section of the fitting portion 10 between the shaft portion 3 and the shaft 4 at the position A2 in FIG. 8. FIG. 11B shows a transverse cross-section of the fitting portion 10 at the position A3 in FIG. 8. The two-dot chain line shown in FIG. 11B shows the position of the inner cylinder portion 43 of the shaft 4. FIG. 12 shows the winding device 1 at the wall portion 73 of the half case 7 and surrounding area. FIG. 13 shows a state to fit the shaft 4 and the rotor member 33 to each other. FIG. 14 shows a state that the shaft 4 and the rotor member 33 are fitted to each other.

In the specification, a reference numeral D1 shown in FIG. 2 and other figures indicates an axial direction (longitudinal direction) of the shaft portion 3, a reference numeral D21 indicates a housing direction of the screen 2, a reference numeral D22 indicates a drawing direction of the screen 2, a reference numeral D2 shown in FIG. 10A and other figures indicates a radial direction with the rotation axis AX1 as a center, a reference numeral D3 indicates an outside in the radial direction (outside in the radial direction D2), a reference numeral D4 indicates an inside in the radial direction (inside in the radial direction D2), a reference numeral D11 shown in FIG. 2 indicates an outside in the axial direction (outside in the axial direction D1 with respect to the shaft body 31), a reference numeral D12 indicates an inside in the axial direction (inside in the axial direction D1 with respect to the shaft body 31), and a reference numeral DR1 shown in FIG. 5 indicates a rotation direction for winding the screen 2.

The screen 2 is also called as a blind sheet. The screen 2 blocks at least a part of transmitted light. A body portion 2a of the screen 2 is made of sheet-like material having flexibility to be drawn out from a predetermined winding position P11 to a predetermined drawing position P12. The body portion 2a can be wound from the drawing position P12 to the winding position P11. The body portion 2a of the screen can be cloth such as polyester woven fabric, leather using resin material, a sheet formed by molding resin molding material and the like. A translucent sheet and a transparent sheet capable of blocking ultraviolet rays can be also used, for example. The transmitted light includes ultraviolet rays and the like. The body portion of the screen for the sunshade device is formed, for example, by cutting a soft material having a light-shielding property of approximately 50 to 90% and having flexibility into a predetermined shape. The body portion is drawn out upward from the case 7 and covers a vehicle door window in the vehicle cabin. The winding device 1 blocks sunlight to protect occupants from dazzling, and reduces visibility from outside of the vehicle for protecting privacy and protecting against crime during parking.

A double-sided tape 22 is stuck to the one end 2b of the screen 2 shown in FIG. 2. The one end 2b of the screen is adhered to an outer peripheral surface 31o of the shaft body 31 and an outer peripheral surface 37o of the shaft 4 by winding the shaft portion 3 on an area where the double-sided tape 22 is stuck.

A garnish member 21, which is harder than the body portion 2a, is attached to a tip edge (the other end 2c) of the screen 2. For the garnish member 21, a plate-like member, a rod-like member and a cylindrical member can be used, for example. In addition, a molded article such as an injection molded article of synthetic resin can be also used, for example. The garnish member can be formed by preparing an inner component and an outer component and then sandwiching the tip edge of the screen by the both components to be fitted and integrated with each other. In order to keep the drawn out state of the screen 2, engagement holes 21a, 21a are provided on the garnish member 21 so as to be hooked on hooks of the door side. In addition, a lever member 21b is provided on the garnish member 21 so that the lever member 21b is supported by a not illustrated pipe member and rotatable around the pipe member.

The shaft portion 3 shown in FIGS. 2 to 4 and other figures has a shaft body 31, a shaft 32 and a rotor member 33.

The shaft body 31 is housed in the half case 7 so that the shaft body 31 is rotatable around the rotation axis AX1 of the shaft portion 3 located at a housing position P1. The cylindrical body 31 can have a tubular shape such as a cylindrical shape or a bar shape such as a columnar shape. As shown in FIG. 8, an opening 31c is formed on the end portion 31a of the shaft body 31 at the spring unit U1 side so that an insertion portion 34 of the rotor member 33 of the present technology is inserted into the opening 31c. An opening is formed on the other end portion 31b of the shaft body 31 so that an insertion portion 32a of a shaft 32 without having the biasing portion is inserted into the opening. Accordingly, the rotor member 33 is assembled with the one end portion 31a of the shaft body 31 and the shaft 32 is assembled with the other end portion 31b. The end portion 4a of the shaft (rotary shaft member) 4 is fitted to the end portion 3a of the spring unit U1 side of the rotor member 33. The shaft 4 passes through the insertion hole 74 of the wall portion 73 of the spring unit U1 side of the case 7. The spring unit U1 is an external spring unit using a spiral spring (spring 51). For the material of the shaft body 31, metals such as aluminum and synthetic resins such as thermoplastic resin can be used, for example. When a pipe material formed by extruding aluminum in a tubular shape is used as the shaft body 31, the weight of the shaft body 31 can be easily lighter and required strength can be easily obtained. A size of the tubular shaft body made of aluminum is not particularly limited. For example, an inner diameter can be approximately 4 to 20 mm and an outer diameter can be approximately 6 to 30 mm.

In the shaft 32, an end portion 32b, which is located at an opposite side of the insertion portion 32a, is inserted into a hole 70c of a wall portion 72 of the case 7 and finally inserted into a cap (shaft holding portion) 79. The shaft 32 is supported by the wall portion 72 of the case via the cap 79 so that the shaft 32 is rotatable around the axial center AX1. For the shaft 32 and the cap 79, a molded article such as an injection molded article of synthetic resin can be used, for example. For the synthetic resin, thermoplastics resins such as polybutylene terephthalate (PBT) containing a reinforcing fiber can be used, if required.

As shown in FIG. 8, the rotor member 33 is inserted into the opening 31c and fitted to the end portion 31a of the shaft body 31 so that the rotor member 33 is rotated around the rotation axis AX1 along the axial direction D1 of the shaft body 31. The one end 2b of the screen 2 is attached to both on the outer peripheral surface 37o of the outer cylinder portion 37 of the rotor member 33 and the outer peripheral surface 31o of the shaft body 31. On the rotor member 33 shown in FIG. 6, FIG. 9A and other figures, the insertion portion 34 to be inserted into the shaft body 31 is formed from a substantially annular base portion 35 to the inside D12 in the axial direction, and the protruded portion 36 and the outer cylinder portion 37 are formed from the base portion 35 to the outside D11 in the axial direction. The base portion 35 has a hole 34a having a circular cross section with the rotation axis AX1 as a center.

As also shown in the transverse cross-section of FIG. 10A, a plurality of projected ridges 34b and a plurality of grooves 34c are formed on an outer peripheral surface of the insertion portion 34 along the rotation axis AX1. Note that the "ridge" means a line. Grooves corresponding respectively to each of the projected ridges 34b and projected ridges corresponding respectively to each of the grooves 34c are formed on the inner peripheral surface of at least the end portion 31a of the shaft body 31. Accordingly, the shaft body 31 into which the insertion portion 34 is inserted is rotated together with the rotor member 33 around the rotation axis AX1 without slipping. Thus, the relation of the rotation angle is maintained.

The protruded portion 36 is protruded from the base portion 35 toward the shaft 4 (outside D11 in the axial direction) at a position that the rotation axis AX1 passes through. The protruded portion 36 shown in FIG. 9A has a trunk portion 36a protruded from the base portion 35 toward the outside D11 in the axial direction and a trifurcated portion 36b further protruded from the trunk portion 36a toward the outside D11 in the axial direction. An outer shape of the trunk portion 36a is formed in a circular shape in the transverse cross-section. The trifurcated portion 36b shown also in FIG. 10B and FIG. 11A has three projected ridges 36c extended toward the outside D3 in the radial direction so that the angles of each projected ridges 36c extended from the rotation axis AX1 is different by 120° from other projected ridges. Accordingly, the trifurcated portion 36b is a portion formed in a trifurcated shape in a cross section perpendicular to the rotation axis AX1. Each of the projected ridges 36c has a taper shape (shape tapered toward the tip) 36d that is closer to the rotation axis AX1 toward the tip (outside D11 in the axial direction).

The outer cylinder portion 37 is extended from the base portion 35 toward the shaft 4 (outside D11 in the axial direction) around the protruded portion 36 with the rotation axis AX1 as a center. An opening portion 35o of the rotor is formed between the outer cylinder portion 37 and the protruded portion 36 so that the inner cylinder portion 43 of the shaft 4 is inserted into the opening portion 35o. The outer peripheral surface 37o of the outer cylinder portion 37 is aligned with the outer peripheral surface 31o of the shaft body 31. The one end 2b of the screen is fixed to the outer peripheral surface 37o and the outer peripheral surface 31o. As also shown in FIG. 10B and FIG. 11B, a plurality of pawl portions (hooking structure) 37a is projected from the inner peripheral surface 37i of the outer cylinder portion 37 toward the rotation axis AX1 (inside D4 in the radial direction). Each of the pawl portions 37a is formed at a position alternately arranged with each of the projected ridges 36c of the trifurcated portion 36b. Note that the position and the number of the pawl portions 37a are not particularly limited. On the outer cylinder portion 37, side openings 37b are formed between the base portion 35 and each of the pawl portions 37a. Accordingly, when the inner cylinder portion 43 is inserted into the outer cylinder portion 37, each of the pawl portions 37a is elastically deformed easily to override the inner cylinder portion 43.

For the rotor member 33, a molded article such as an injection molded article of synthetic resin can be used, for example. For the synthetic resin, thermoplastics resins such as polyamide and polyacetal (POM) can be used, for example. Additives such as a reinforcing fiber can be added to the above described resins. The polyamide and the POM have high strength and particularly have excellent sliding properties, and therefore these materials are suitable for the rotor member which receives the force in the rotation direction. The material easily adhered to one end of the screen is preferable for the material of the rotor member. For example, when the polyamide is used for the material of the rotor member, one end of the screen can be easily adhered to the rotor member by using a double-sided tape.

The spring unit U1 shown in FIG. 4 and other figures has the shaft (rotary shaft member) 4, the biasing portion 5 and the housing 6.

As shown in FIG. 8, the shaft (rotary shaft member) 4 is inserted into the housing 6 so that the outside D11 of a flange portion 41 in the axial direction enters in the housing 6 and the inside D12 of the flange portion 41 in the axial direction protrudes from the housing 6. The protruded portion located at the inside D12 in the axial direction is inserted into the opening portion 35o of the rotor and fitted to the end portion 3a of the rotor member 33. Thus, the shaft 4 rotates around the rotation axis AX1 along the axial direction D1 of the shaft portion 3. On the shaft 4 shown also in FIG. 7, FIG. 9B and other figures, a recessed portion 42 recessed from the end portion 4a of the inside D12 in the axial direction toward the housing 6 is formed, and an insertion portion 45 to be inserted into the housing 6 is formed from the substantially annular flange portion 41 surrounding the recessed portion 42 with the rotation axis AX1 as a center to the outside D11 in the axial direction. In addition, the inner cylinder portion 43 is formed on the shaft 4 around an entrance portion 42a of the recessed portion 42 with the rotation axis AX1 as a center. Furthermore, the annular groove 44 recessed from the outer peripheral surface 43o of the inner cylinder portion 43 to the inside is formed on the shaft 4.

The recessed portion 42 is recessed from an opening portion 41o located at the end portion 4a of the shaft 4 in the inside D12 of the axial direction toward the housing 6. The recessed portion 42 fits to the protruded portion 36 of the rotor member 33 at a position that the rotation axis AX1 passes through. The recessed portion 42 shown in FIG. 9B has an entrance portion 42a recessed toward the outside D11 in the axial direction and a trifurcated portion 42b further recessed from the entrance portion 42a toward the outside D11 in the axial direction. The trunk portion 36a of the rotor member is inserted from the opening portion 41o of the shaft into the entrance portion 42a. The trifurcated portion 42b shown also in FIG. 10C and FIG. 11A has grooves 42c so that the projected ridges 36c of the trifurcated portion 36b of the rotor member are inserted into the grooves 42c. Each of the grooves 42c is formed at a position different by 120° from other grooves seen from the rotation axis AX1. Accordingly, the trifurcated portion 42b is a portion formed in a trifurcated form in a cross section perpendicular to the rotation axis AX1 so that the trifurcated portion 42b fits to the trifurcated portion 36b of the rotor member. Each of the grooves 42c has a taper portion (hole shape tapered toward the deep side) 42d that is closer to the rotation axis AX1 toward a deep side (outside D11 in the axial direction) of the recessed portion 42.

When the trifurcated portion 36b of the rotor member is inserted into the trifurcated portion 42b of the shaft, relative rotation of the rotor member 33 is restricted with respect to the shaft 4. Namely, the shaft 4 and the rotor member 33 are rotated together around the rotation axis AX1 without slipping. Thus, the relation of the rotation angle is maintained. Accordingly, the trifurcated portions 36b, 42b constitute the relative rotation restriction structure 11 provided on the fitting portion 10. The recessed portion 42 does not have a structure of restricting the movement of the protruded portion 36 toward the inside D12 in the axial direction. The protruded portion 36 does not have a structure of restricting the movement of the recessed portion 42 toward the outside D11 in the axial direction. Accordingly, the relative rotation restriction structure 11 shown in FIG. 8 allows the movement of the shaft portion 3 in the axial direction D1 with respect to the shaft 4.

The inner cylinder portion 43 is extended from the flange portion 41 toward the shaft body 31 (inside D12 in the axial direction) around the recessed portion 42 with the rotation axis AX1 as a center. The protruded portion 36 of the rotor member 33 is inserted into the opening portion 41o of the shaft, the opening portion 41o being surrounded by the extending end of the inner cylinder portion 43. As shown in FIG. 8, the inner cylinder portion 43 is inserted into the opening portion 35o of the rotor. In other words, the inner cylinder portion 43 is inserted between the protruded portion 36 and the outer cylinder portion 37. The pawl portions 37a of the rotor member is inserted into the annular groove 44 shown also in FIG. 9B after the pawl portions 37a is elastically deformed to override the outer peripheral surface 43o of the inner cylinder portion 43. Thus, the movement of the rotor member 33 in the axial direction D1 is restricted with respect to the shaft 4. Accordingly, the outer cylinder portion 37 having the pawl portions 37a and the inner cylinder portion 43 having the annular groove 44 constitute the movement restriction structure 12 provided on the fitting portion 10 at a position different from the relative rotation restriction structure 11. The inner cylinder portion 43 does not have a structure restricting the relative rotation of the outer cylinder portion 37 around the rotation axis AX1. The outer cylinder portion 37 does not have a structure restricting the relative rotation of the inner cylinder portion 43 around the rotation axis AX1. Namely, if the trifurcated portions 36b, 42b are not provided, the outer cylinder portion 37 and the inner cylinder portion 43 can be relatively rotated around the rotation axis AX1. Accordingly, the movement restriction structure 12 shown in FIG. 8 allows the relative rotation of the outer cylinder portion 37 (shaft portion 3) with respect to the inner cylinder portion 43 (shaft 4).

As shown in FIG. 9B and other figures, a lock portion 47 to be locked having approximately rectangular shape in cross section is formed on a tip portion of the insertion portion 45, and a second flange portion 48 having an approximately annular shape with the rotation axis AX1 as a center is formed at an intermediate portion of the insertion portion 45. An approximately cylindrical portion having a spring end locking portion 46 is formed between the lock portion 47 and the second flange portion 48 to lock an inner folded piece 51a (shown in FIG. 5) of the spring 51 (biasing portion 5).

For the shaft 4, a molded article such as an injection molded article of synthetic resin can be used, for example. For the synthetic resin, thermoplastics resins such as polybutylene terephthalate (PBT) can be used, for example. Additives such as a reinforcing fiber can be added to the above described resins. If hard resins such as the PBT are used for a material of the shaft 4, the pawl portions 37a is easily extended toward the outside D3 in the radial direction when the pawl portions 37a of the rotor member 33 overrides the inner cylinder portion 43. Thus, a backlash of the shaft portion 3 caused by the load from the shaft portion 3 is suppressed.

The spring 51 (biasing portion 5) biases the shaft portion 3 via the shaft 4 in the rotation direction DR1 for winding the screen 2. The spring 51 shown in FIG. 5 is a spiral spring formed by spirally winding an elastic member such as a stainless material. The inner folded piece 51a located at an inner terminal is locked to the spring end locking portion 46 of the shaft 4. An outer folded piece 51b located at an outer terminal is locked to a locking projection piece 63h of a spring case 63. The rotation direction DR1 can be the direction shown in FIG. 5 and can be an opposite direction of the direction shown in FIG. 5.

The housing 6 shown in FIGS. 4 and 5 has a spring case 63, a cap 64 and a flexible clip 65. The housing 6 houses the spring 51. The shaft 4 passes through the housing 6 so that the shaft 4 can be rotated around the rotation axis AX1.

In order to house the spring 51, the spring case 63 has a housing recessed portion 63c opened at the cap 64 side. A through hole 61a of the shaft insertion portion 61 leads to a bottom portion of the housing recessed portion 63c. A plurality of not illustrated flexibly deformable anti-backlash pawls are formed on the through hole 61a. When the insertion portion 45 of the shaft 4 is inserted into the through hole 61a toward the outside D11 in the axial direction, the anti-backlash pawls are flexed toward the outside D3 in the radial direction to lock the second flange portion 48. Thus, the movement of the shaft 4 in the axial direction D1 is restricted. On an inner surface of the housing recessed portion 63c, a recessed portion 63d recessed toward the outside D3 in the radial direction is formed so that the outer terminal portion of the spring 51 is arranged on the recessed portion 63d. Near the recessed portion 63d, the locking projection piece 63h is projected from a bottom face of the housing recessed portion 63c toward the outside D11 in the axial direction so that the outer folded piece 51b of the spring 51 is locked to the locking projection piece 63h. On an outer surface of a side wall portion 63e of the housing recessed portion 63c, three projections 63f and a positioning rib 63g for positioning the cap 64 are formed integrally with the spring case 63. The projections 63f have an inclined face inclined downward the inside D4 in the radial direction as going toward the outside D11 in the axial direction. As shown in FIGS. 4 and 8, the spring case 63 has the shaft insertion portion 61 protruded from a portion of the housing body 60 toward the inside D12 in the axial direction at a position that the shaft 4 passes through. The spring case 63 has the hooking portion 62 protruded toward the outside D3 in the radial direction at the outside D3 in the radial direction of the shaft insertion portion 61 with the rotation axis AX1 as a center. As shown also in FIG. 12, the hooking portion 62 is formed in an approximately rectangular shape in the transverse cross-section. The hooking portion 62 is projected toward the outside D3 in the radial direction.

The cap 64 is fitted to the spring case 63 to close an opening of the spring case 63. A hole portion 64e is formed on a body portion 64a of the cap 64 so that the lock portion 47 is inserted into the hole portion 64e and rotatable around the rotation axis AX1. Three flexible pieces 64b are projected from the body portion 64a toward the inside D12 in the axial direction so that the flexible pieces 64b are positioned by the positioning rib 63g. Fitting holes 64c are formed on each of the flexible pieces 64b so that the projections 63f are inserted into the fitting holes 64c. A sliding guide portion 64d is formed on an end surface of the inside D12 in the axial direction of the body portion 64a so that the clip 65 is slid on the sliding guide portion 64d along a track T1 orthogonal to the rotation axis AX1. The direction of the track T1 passes through both a lock position for prohibiting the rotation of the shaft 4 and a lock release position for releasing the prohibition of the rotation of the shaft 4. The sliding guide portion 64d has a vertical wall portion 64f extended toward the outside D11 in the axial direction at a position surrounding the periphery of the hole portion 64e. When housing the spring 51 in the housing recessed portion 63c, the inner folded piece 51a is locked to the spring end locking portion 46 of the shaft 4, which is inserted into the housing recessed portion 63c from the through hole 61a, and the outer folded piece 51b is locked to the locking projection piece 63h of the spring case 63. After the spring 51 is housed in the housing recessed portion 63c, the flexible pieces 64b are positioned by the positioning rib 63g and the cap 64 is fitted to the spring case 63 so that the projections 63f are inserted into the fitting holes 64c. Thus, the housing 6 is formed.

On a surface of the inside D12 in the axial direction of the clip 65, a recessed portion 65i having a space matched with a side length (length of one side in the transverse cross-section) of the lock portion 47 having an approximately rectangular shape in cross section. When seen from the direction along the axial direction D1, the lock position is a position where the recessed portion 65i and the insertion portion 45 of the shaft are overlapped, and the lock release position is a position where the recessed portion 65i and the insertion portion 45 of the shaft are not overlapped. If two sides of the lock portion 47 having an approximately rectangular shape in cross section are along (parallel to) the track T1 of the clip 65, the lock portion 47 enters in the recessed portion 65i when the clip 65 is slid from the lock release position to the lock position. The recessed portion 65i engages with the lock portion 47 to prohibit the rotation of the shaft portion 3 including the shaft 4.

When the housing 6 is assembled from the spring case 63, the cap 64 and the clip 65, the housing 6 has the housing body 60, the shaft insertion portion 61 and the hooking portion 62.

For the spring case 63, the cap 64 and the clip 65, a molded article such as an injection molded article of synthetic resin can be used, for example. For the synthetic resin, thermoplastic resins such as POM, polypropylene (PP), a composite material of the above materials, and a material formed by adding additives to the above materials can be used, for example.

The half case 7 shown in FIG. 3 and other figures has a pair of wall portions 72, 73 formed on both end portions of the axial direction D1 and a side face portion 71 in which an opening portion 71o is formed. The shaft portion 3 is supported by the half case 7 so that the shaft portion 3 is rotatable around the rotation axis AX1. As "side face" can mean faces other than the bottom face of a rectangular column and a cylindrical column, the side face portion 71 of the case 7 means a portion of surrounding the shaft portion 3 when the shaft portion 3 is located at the housing position P1. Consequently, the side face portion 71 includes a back portion 71a, which is a portion arranged in a longitudinal direction viewed from a user, and a bottom portion 71b, which is arranged in a vertical direction viewed from a user. The side face portion 71 is formed in an approximately L-shape in cross section so that the back portion 71a and the bottom portion 71b are substantially perpendicular to each other. The opening portion 71o formed on the side face portion 71 is wider than the maximum diameter of the shaft portion 3 so that the shaft portion 3 can be inserted into the housing position P1 from the outside D3 in the radial direction. The opening portion 71o is also a portion from which the screen 2 is drawn out.

The wall portions 72, 73 are formed in a vertical wall shape approximately orthogonal to the longitudinal direction (axial direction D1) of the case 7. A hole 70c is formed on the wall portion 72 of the shaft 32 side so that the end portion 32b of the shaft 32 is inserted into the hole 70c with a clearance. After the end portion 32b of the shaft is inserted into the hole 70c, the cap 79 is inserted into the hole 70c. Consequently, the end portion 32b of the shaft is supported by the wall portion 72 via the cap 79 so that the end portion 32b of the shaft is rotatable around the rotation axis AX1.

As shown also in FIG. 12, the insertion hole 74 is formed on the biasing portion 5 side of the wall portion 73 so that the shaft insertion portion 61 of the spring unit U1 is inserted into the insertion hole 74. The recess 75 leads to the insertion hole 74 so that the hooking portion 62 of the spring unit U1 passes through the recess 75. The recess 75 is formed in a notch shape corresponding to the approximately rectangular shape of the hooking portion 62 in the transverse cross-section. The recess 75 is recessed toward the outside D3 in the radial direction.

The half case 7 is fitted to the recessed portion formed on the door trim side to form a housing space of the shaft body 31, the screen 2 and other components. The case 7 is a half-split body forming a part of the housing part of the winding device. The case 7 is unitized by being preliminarily assembled with the components such as the screen. Thus, only by assembling the case 7 with the door trim, the winding device is assembled with the door. Of course, the case used for unitizing the winding device can be any cases other than the half case. For example, a case covering entire the shading device can be used.

The winding device 1 is shipped in a state that the components such as the screen 2 are preliminarily assembled with the half case 7. In an assembling process of the door trim, the case 7 is fastened to the vehicle body by inserting a conventionally known fastening means such as a screw into a plurality of through holes 70a formed on the case 7. Thus, the winding device 1 is integrated with the vehicle body.

For the case 7, a molded article such as an injection molded article of synthetic resin can be used, for example. For the synthetic resin, general-purpose resins can be widely used. According to the necessity, thermoplastic resins such as polypropylene (PP) including additives can be used, for example.

Then, an example of manufacturing method, operation and effect of the winding device 1 will be explained.

The spring unit U1 can be assembled by the below described procedures, for example.

First, the insertion portion 45 of the shaft 4 is inserted into the through hole 61a of the shaft insertion portion 61 of the spring case 63, the inner folded piece 51a of the spring 51 is locked to the spring end locking portion 46 of the shaft 4, and the spring 51 is housed in the housing recessed portion 63c of the spring case 63. In addition, the outer folded piece 51b of the spring 51 is locked to the locking projection piece 63h of the spring case 63, and the spring case 63 is fitted to the cap 64 so that the lock portion 47 of the shaft 4 is inserted into the hole portion 64e of the cap 64. Furthermore, the shaft 4 can be preliminarily wound to be biased toward the rotation direction DR1 for winding the screen 2 and the clip 65 inserted into the sliding guide portion 64d of the clip 65 can be slid to the lock position so that the shaft 4 is not rotated. Thus, the spring unit U1 is assembled. As shown in FIG. 13, the end portion 4a located at the inside D12 in the axial direction of the shaft 4 is protruded from the shaft insertion portion 61 of the housing 6.

The shaft portion 3 around which the screen 2 is wound can be assembled by the below described procedures, for example.

First, the insertion portion 34 of the rotor member 33 is inserted into one end portion 31a of the shaft body 31, and the insertion portion 32a of the shaft 32 is inserted into the other end portion 31b of the shaft 32. Consequently, the shaft body 31 included in the shaft portion 3, the rotor member 33 and the shaft 32 are integrally rotated around the rotation axis AX1 without slipping. Thus, the relation of the rotation angle is maintained. In addition, the one end 2b of the screen 2 is bonded by a double-sided tape to at least both the outer peripheral surface 31o of the shaft body 31 and the outer peripheral surface 37o of the rotor member 33 continuously. Consequently, the fixing strength between the shaft body 31 and the rotor member 33 is improved especially in the axial direction D1. Furthermore, the screen 2 is wound around the shaft portion 3 in accordance with the rotation direction DR1 of winding the screen 2. As explained above, the shaft portion 3 around which the screen 2 is wound is assembled. The outer cylinder portion 37 of the rotor member 33 is protruded from one end portion 31a of the shaft body 31 toward the outside D11 in the axial direction, and the trifurcated portion 36b of the protruded portion 36 is further protruded from the outer cylinder portion 37 toward the outside D11 in the axial direction.

Then, as shown in FIG. 13, the shaft 4 and the rotor member 33 are fitted to each other in a state of passing through the wall portion 73 of the spring unit U1 side of the half case 7. In order to achieve this, the shaft portion 3 can be temporarily placed on the case 7 in a state that the trifurcated portion 36b of the rotor member 33 is preliminarily inserted into the insertion hole 74 of the wall portion 73. As a result, the trifurcated portion 36b is kept to be protruded from the insertion hole 74 toward the outside D11 in the axial direction without lifting the shaft portion 3 by hands. Thus, the work of fitting the shaft 4 and the rotor member 33 to each other can be easily performed. Then, the end portion 4a of the shaft 4 of the spring unit U1 is brought close to the insertion hole 74, and the protruded portion 36 of the rotor member 33 is inserted into the opening portion 41o of the shaft. At this time, as shown in FIG. 9A and other figures, the trifurcated portion 36b of the rotor member 33 is the taper shape (shape tapered toward the tip) 36d. Thus, the protruded portion 36 is easily inserted into the opening portion 41o. In addition, as shown in FIG. 9B and other figures, the taper portion (hole shape tapered toward the deep side) 42d is formed on the trifurcated portion 42b of the shaft 4. Thus, the trifurcated portion 36b of the rotor member is guided to the inside D4 in the radial direction. Consequently, the shaft 4 and the rotor member 33 are positioned with the rotation axis AX1 as a center. Accordingly, the work of fitting the shaft 4 and the rotor member 33 to each other can be easily performed.

Here, the relative rotation restriction structure 11 is not necessarily formed in a trifurcated form in the transverse cross-section. As shown in FIG. 11A, since the fitting parts (trifurcated portions 36b, 42b) of the protruded portion 36 and the recessed portion 42 are formed in a trifurcated form in the transverse cross-section, the relative rotation of the rotor member 33 with respect to the shaft 4 is preferably restricted. Here, if the fitting parts of the protruded portion and the recessed portion are formed in a rectangular shape in cross section, the rotation angle of the rotor member fitted to the shaft is every 180°. In this case, the work of inserting and fitting the protruded portion of the rotor member into the recessed portion of the shaft should be performed accompanying difficulty in visual observation. Thus, there is a possibility of taking much time for the work. If the rotation angle of the rotor member fitted to the shaft is every 180°, it means to be easily influenced by a molding error. Thus, there is a possibility of easily causing the backlash of the shaft portion. When the fitting part between the protruded portion and the recessed portion is formed in a cross shape in cross section, each of the projected ridges of the cross shape of the protruded portion is thin at the portion formed in a cross shape in cross section. Thus, there is a possibility of narrowing the grooves of the recessed portion at the portion formed in a cross shape in cross section. Consequently, strength against a load is reduced in the rotation direction. Thus, the relative rotation of the rotor member may not be restricted with respect to the shaft due to abrasion caused by repeated use, for example. When the relative rotation restriction structure 11 is formed in a trifurcated form in the transverse cross-section, the above described possibilities can be suppressed.

When the protruded portion 36 is inserted into the recessed portion 42, an inner cylinder portion 43 of the shaft 4 is inserted into the opening portion 35o of the rotor, i.e., between the protruded portion 36 and the outer cylinder portion 37. Thus, the fitting portion 10 shown in FIG. 14 is finally formed. At this time, the pawl portions (hooking structure) 37a of the inner peripheral surface 37i of the outer cylinder portion are pushed by the inner cylinder portion 43, elastically deformed toward the outside D3 in the radial direction, and then inserted into the annular groove 44. Thus, the movement of the rotor member 33 in the axial direction D1 with respect to the shaft 4 is restricted. Accordingly, by a simple work of pushing the protruded portion 36 into the recessed portion 42, the shaft portion 3 is fitted to the shaft 4 so that the shaft portion 3 is not relatively rotated with respect to the shaft 4 and the shaft portion 3 is not displaced in the axial direction D1. Consequently, the displacement of the screen 2 in the axial direction D1 is suppressed and abnormal noise caused by the vibration is suppressed. Thus, a buffer material (separate member) for suppressing abnormal noise is not required on an end face of the shaft portion 3. Accordingly, the winding device 1 of the present invention can form the movement restriction structure 12 by a simple structure by a combination of the pawl portions 37a and the annular groove 44. Thus, usability is good in spite of a low cost configuration by small number of components.

Here, in the relative rotation restriction structure 11 formed by the trifurcated portions 36b, 42b, the rotor member 33 can be freely moved in the inside D12 in the axial direction with respect to the shaft 4 if the pawl portions 37a and the annular groove 44 are not provided. In addition, the movement restriction structure 12 formed by the pawl portions 37a and the annular groove 44 is formed at a different position from the relative rotation restriction structure 11, and the rotor member 33 is freely rotated 360° relatively to the shaft 4 if the trifurcated portions 36b, 42b are not provided. Consequently, the load of the rotation applied to the fitting portion 10 between the shaft 4 and the rotor member 33 and the load applied in the axial direction D1 are distributed to different positions. If the structure of restricting the relative rotation of the rotor member with respect to the shaft and the structure of restricting the movement of the rotor member in the axial direction are located at the same position, both the load of the rotation due to the use of the screen and the load in the axial direction are concentrated at one position of the above described structure. As a result, the displacement of the shaft portion in the axial direction may occur due to deformation and abrasion, and usability may be deteriorated due to torque change of the shaft portion, for example. In the winding device 1 of the present invention, the loads are applied to the fitting portion 10 while being divided into the relative rotation restriction structure 11 and the movement restriction structure 12 which are located in the different positions. Thus, the deformation and abrasion of the fitting portion 10 are suppressed and durability can be increased at low cost.

In addition, as shown in FIG. 11B, the fitting portion 10 is formed by three components: the protruded portion 36 of the rotor member 33; the inner cylinder portion 43 of the shaft 4; and the outer cylinder portion 37 of the rotor member 33 in order from the rotation axis AX1 toward the outside D3 in the radial direction. Annular portions are overlapped with each other in three layers at the fitting portion 10. Thus, the fitting portion 10 is strong against the load in the radial direction D2 and therefore axial deflection hardly occurs.

As shown in FIG. 14, when the shaft 4 and the rotor member 33 are fitted to each other in the state of passing through the wall portion 73 of the case, the shaft insertion portion 61 of the housing 6 is located at the outside D11 in the axial direction compared to the wall portion 73. Hence, the shaft insertion portion 61 should be inserted into the insertion hole 74 of the wall portion 73 to attach the spring unit U1 with the wall portion 73. At this time, a worker should align the hooking portion 62 with the recess 75 (shown in FIG. 12) which leads to the insertion hole 74, insert the shaft insertion portion 61 into the insertion hole 74 from the outside D11 in the axial direction of the wall portion 73, and rotate the housing 6 with the rotation axis AX1 as a center. Consequently, as shown in FIG. 12, the hooking portion 62 that has passed through the recess 75 is hooked on the inner surface of the wall portion 73, and the housing body 60 is fixed to the outside of the wall portion 73. As explained above, the shaft portion 3 around which the screen 2 is wound can be formed and a winding unit formed by assembling the spring unit U1 on the case 73 can be formed. Since the shaft insertion portion 61 and the hooking portion 62 are provided on the spring unit U1, fastening member such as a screw is not required for attaching the spring unit U1. Thus, the winding device 1 can be easily assembled. When removing the spring unit U1 from the wall portion 73 for the purpose of maintenance of the winding device 1 or the like, the housing 6 should be rotated with the rotation axis AX1 as a center to align the hooking portion 62 with the recess 75. Thus, the shaft insertion portion 61 can be pulled out of the insertion hole 74. Since the shaft insertion portion 61 and the hooking portion 62 are provided on the spring unit U1, detaching operation of the fastening member is not required. Thus, the winding device 1 can be easily maintenanced, for example.

When the shaft 4 is not preliminarily wound, the shaft 4 can be wound by sliding the clip 65 inserted into the sliding guide portion 64d of the cap 64 to the lock release position, then preliminarily winding the shaft portion 3 in the rotation direction DR1 to bias the shaft portion 3 for winding the screen 2, and then sliding the clip 65 to the lock position to prohibit the rotation of the shaft portion 3.

By assembling the case 7 of the above described winding unit with the door trim, the winding device is assembled with the door.

(3) Variation Examples

Various variation examples can be considered for the present invention.

The winding device as the sunshade device can be installed on a rear window, a roof window or a front window, for example, without limited to a side window. The winding device can be a tonneau cover device, for example. The drawing direction of the screen can be downward and horizontally, for example, without limited to upward.

The shaft body 31, the shaft 32 and the rotor member 33 included in the shaft portion 3 can be replaced with a member partly or wholly inseparable. For example, a single member having both functions of the shaft body 31 and the rotor member 33 can be used for the shaft portion 3.

The biasing portion can be a helical spring (coil spring) and an elastic member formed of elastomer, for example, without limited to the spiral spring.

The hooking structure can be formed on the inner cylinder portion of the rotary shaft member instead of forming the hooking structure on the outer cylinder portion of the shaft portion. For example, the movement restriction structure can be formed by the pawl portions (hooking structure) protruded from the outer peripheral surface of the inner cylinder portion toward the outside in the radial direction and the annular groove recessed from the inner peripheral surface of the outer cylinder portion toward the outside in the radial direction. In this case, the movement of the shaft portion in the axial direction with respect to the rotary shaft member is restricted by inserting the pawl portions of the rotary shaft member side into the annular groove of the shaft portion side.

The inner cylinder portion can be formed on the shaft portion instead of the rotary shaft member, and the outer cylinder portion can be formed on the rotary shaft member instead of the shaft portion. In this case, the inner cylinder portion of the shaft portion is located at the periphery of the protruded portion with the rotation axis as a center, and the inner cylinder portion of the shaft portion is inserted into the inner side of the outer cylinder portion of the rotary shaft member. Also in this case, the movement restriction structure can be formed by the inner cylinder portion and the outer cylinder portion.

Figure 15:
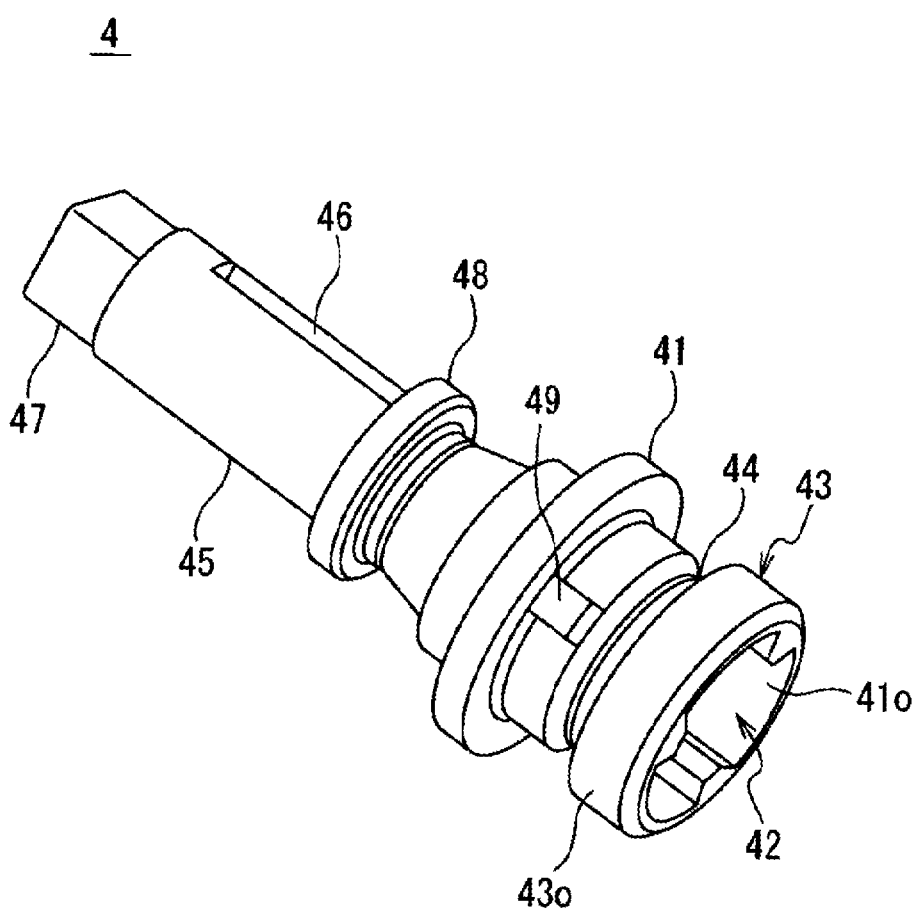
FIG. 15 is a perspective view showing an example of an outer appearance of the rotary shaft member concerning a variation example.
Figure 16:
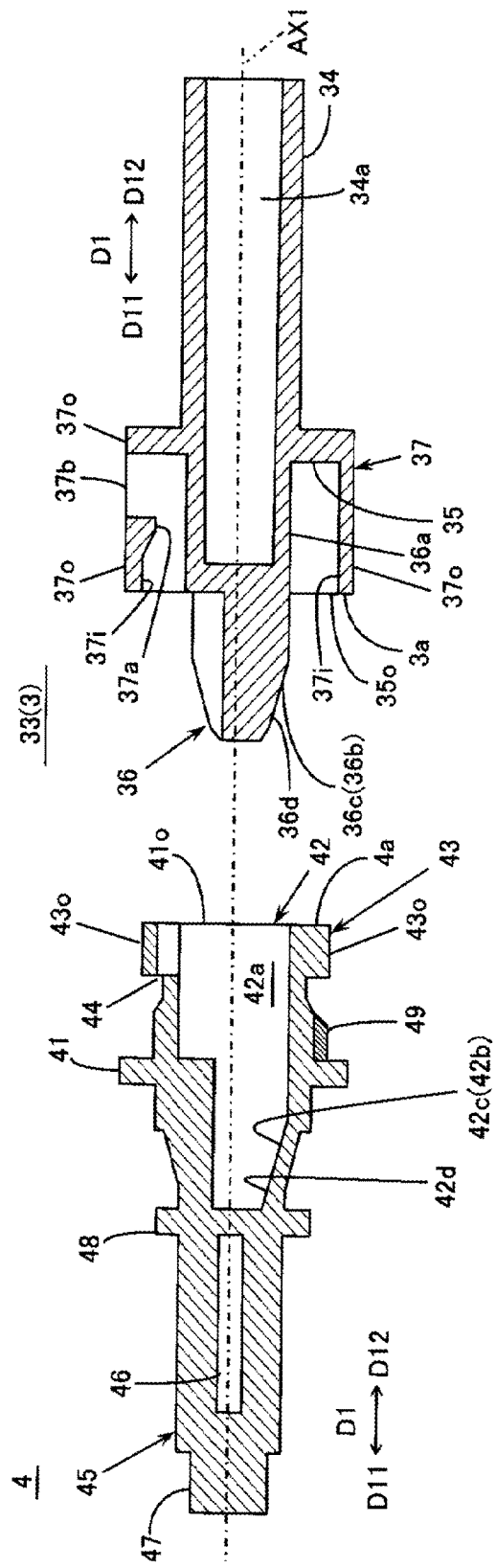
FIG. 16 is a vertical cross-sectional view showing an example of a main part of the winding device 1 concerning the variation example.

FIG. 15 shows an outer appearance of the shaft (rotary shaft member) 4 concerning a variation example. FIG. 16 shows a main part of the winding device in a disassembled state concerning the variation example. In the shaft 4 of the variation example, a contact rib 49 protruded toward the outside D3 in the radial direction is formed between the flange portion 41 and the annular groove 44. Note that hatching of the contact rib 49 is different from other portions in FIG. 16 for emphasizing the contact rib 49. However, the contact rib 49 is a portion integrally formed with the shaft 4. Although only one contact rib 49 is shown in FIGS. 15 and 16, a plurality of contact ribs 49 is formed on the periphery of the rotation axis AX1 (e.g., three portions formed at the rotation angles different by 120°). The position of the outer peripheral surface of the contact rib 49 in the radial direction D2 (shown in FIG. 10A) is aligned with the position of the outer peripheral surface 43o of the inner cylinder portion 43. The contact rib 49 is formed so as not to interfere with the pawl portions 37a of the rotor member 33 even when the rotation angle between the shaft 4 and the rotor member 33 is relatively changed with the rotation axis AX1 as a center. Namely, if the trifurcated portions 36b, 42b are not provided, the outer cylinder portion 37 and the inner cylinder portion 43 can be freely rotated 360° relatively to each other with the rotation axis AX1 as a center.

As explained above, after the inner cylinder portion 43 of the shaft 4 is inserted into the opening portion 35o of the rotor, the inner peripheral surface 37i of the outer cylinder portion 37 is in contact with the contact rib 49 when the outer cylinder portion 37 of the rotor member 33 is deformed toward the inside D4 in the radial direction. Consequently, the outer cylinder portion 37 is supported by the contact rib 49. Thus, the strength of the fitting portion is improved against the load in the radial direction D2 orthogonal to the axial direction D1. As a result, deflection of the shaft portion 3 is suppressed. In addition, the deterioration of usability due to torque change of the shaft portion 3 caused by the deflection during when the screen is drawn/housed is suppressed, for example.

Note that the basic effect of the present invention can be obtained even if the winding device does not use the spring unit U1 as long as the screen, the shaft portion, the rotary shaft member and the biasing portion are provided.

The basic effect of the present invention can be obtained even if one end of the screen is not bonded with the outer peripheral surface of the rotor member.

The basic effect of the present invention can be obtained even if the fitting part between the protruded portion and the recessed portion is a rectangular shape or a cross shape in cross section, instead of a trifurcated form in cross section.

(4) Conclusion

As explained above, according to various embodiments, the present invention can provide a technology of the winding device that enables to improve usability and the like. Of course, the above-described basic operation and effect can be obtained even with the components described in the independent claims and having no features set forth in the dependent claims.

The present invention can be also implemented by replacing the features disclosed in the above-described embodiments and variation examples with each other or changing the combinations thereof, and the present invention can be also implemented by replacing the conventional features and the features disclosed in the above-described embodiments and variation examples with each other or changing the combinations thereof. The present invention includes these features and the like.

What is claimed is:

1. A winding device, comprising:
a screen;
a shaft portion to which one end of the screen is fastened;
a rotary shaft member that fits to an end portion of the shaft portion so that the rotary shaft member is rotated around a rotation axis along an axial direction of the shaft portion; and
a biasing portion that biases the rotary shaft member in a rotation direction for winding the screen, wherein
a relative rotation restriction structure and a movement restriction structure are formed on a fitting portion between the shaft portion and the rotary shaft member,
the movement restriction structure and the relative rotation restriction structure are formed in different positions,
the relative rotation restriction structure always restricts a relative rotation of the shaft portion with respect to the rotary shaft member when the shaft portion and the rotary shaft member are fitted with each other, the relative rotation restriction structure allowing the movement of the shaft portion in the axial direction with respect to the rotary shaft member, and
the movement restriction structure restricts a movement of the shaft portion in the axial direction with respect to the rotary shaft member, the movement restriction structure allowing the relative rotation of the shaft portion with respect to the rotary shaft member.

2. The winding device according to claim 1, wherein
the relative rotation restriction structure has a protruded portion formed on the shaft portion and a recessed portion formed on the rotary shaft member, the protruded portion being protruded toward the rotary shaft member at a position that the rotation axis passes through, the recessed portion fitting to the protruded portion at the position that the rotation axis passes through,
the movement restriction structure has an outer cylinder portion formed on the shaft portion and an inner cylinder portion formed on the rotary shaft member, the outer cylinder portion being around the protruded portion with the rotation axis as a center, the inner cylinder portion being around the recessed portion with the rotation axis as a center so as to be inserted between the protruded portion and the outer cylinder portion,
the outer cylinder portion has a hooking structure to restrict a movement of the outer cylinder portion in the axial direction with respect to the inner cylinder portion which is inserted in the outer cylinder portion, and
the hooking structure allows a relative rotation of the outer cylinder portion with respect to the inner cylinder portion.

3. The winding device according to claim 2, wherein
the protruded portion of the shaft portion has a portion formed in a trifurcated form in a cross section perpendicular to the rotation axis, and
the recessed portion of the rotary shaft member has a portion formed in a trifurcated form in a cross section perpendicular to the rotation axis so that the recessed portion fits to the protruded portion.

4. The winding device according to claim 1, wherein
the shaft portion has a shaft body and a rotor member, the shaft body having an opening at an end portion, the rotor member being inserted into the opening and fixed to the end portion of the shaft body, and
the one end of the screen is bonded to both an outer peripheral surface of the shaft body and an outer peripheral surface the rotor member continuously.

5. The winding device according to claim 1, further comprising:
a housing that houses the biasing portion so that the rotary shaft member passes through the housing and is rotatable around the rotation axis; and
a case that has a wall portion crossing the rotation axis so that the shaft portion is held by the case and rotatable around the rotation axis, wherein
the housing has:
a housing body;
a shaft insertion portion that is protruded from the housing body toward the shaft portion at a position that the rotary shaft member passes through; and
a hooking portion that is protruded outward at an outside of the shaft insertion portion with the rotation axis as a center,
the wall portion has an insertion hole that the shaft insertion portion passes through, the insertion hole leading to a recess that the hooking portion passes through, and
the housing body is fixed to an outside of the wall portion by inserting the shaft insertion portion into the insertion hole from an outside of the case while the hooking portion is aligned with the recess and rotating the housing.

* * * * *